(12) United States Patent
Kashibuchi

(10) Patent No.: US 8,223,389 B2
(45) Date of Patent: Jul. 17, 2012

(54) INFORMATION PROCESSING APPARATUS, INFORMATION PROCESSING METHOD, AND PROGRAM AND STORAGE MEDIUM THEREFOR

(75) Inventor: Yoichi Kashibuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 888 days.

(21) Appl. No.: 12/211,539

(22) Filed: Sep. 16, 2008

(65) Prior Publication Data

US 2009/0080000 A1 Mar. 26, 2009

(30) Foreign Application Priority Data

Sep. 20, 2007 (JP) .................................. 2007-244103

(51) Int. Cl.
*G06K 15/02* (2006.01)
*H04N 1/60* (2006.01)

(52) U.S. Cl. ........ 358/1.2; 358/1.9; 358/1.15; 358/1.16; 358/1.17; 358/1.18; 715/200

(58) Field of Classification Search .................... 358/1.2, 358/1.9, 1.1, 1.13, 1.15, 1.16, 1.17, 1.18; 715/200

See application file for complete search history.

(56) References Cited

U.S. PATENT DOCUMENTS

| | | | | | |
|---|---|---|---|---|---|
| 5,093,870 | A | * | 3/1992 | Watanabe | 382/300 |
| 5,500,922 | A | * | 3/1996 | Shimura et al. | 358/1.11 |
| 5,589,949 | A | * | 12/1996 | Miyaza et al. | 358/451 |
| 5,613,017 | A | * | 3/1997 | Rao et al. | 382/174 |
| 5,754,873 | A | * | 5/1998 | Nolan | 715/235 |
| 6,418,180 | B1 | * | 7/2002 | Weiss | 377/6 |
| 6,441,919 | B1 | * | 8/2002 | Parker et al. | 358/1.18 |
| 6,510,243 | B1 | * | 1/2003 | Ikeda | 382/173 |
| 6,529,214 | B1 | * | 3/2003 | Chase et al. | 715/744 |
| 7,158,669 | B2 | * | 1/2007 | Tanaka et al. | 382/166 |
| 7,432,983 | B2 | * | 10/2008 | Masukura et al. | 348/576 |
| 7,797,631 | B2 | * | 9/2010 | Yoshida | 715/269 |
| 7,818,813 | B2 | * | 10/2010 | Morisawa | 726/27 |
| 2003/0131019 | A1 | * | 7/2003 | Kobayashi et al. | 707/104.1 |
| 2004/0075867 | A1 | * | 4/2004 | Watanabe et al. | 358/2.1 |
| 2005/0111053 | A1 | * | 5/2005 | Yoshida et al. | 358/448 |
| 2005/0162676 | A1 | * | 7/2005 | Aoki | 358/1.13 |
| 2007/0168859 | A1 | * | 7/2007 | Fortes | 715/700 |
| 2008/0259387 | A1 | * | 10/2008 | Hirai | 358/1.15 |
| 2009/0080000 | A1 | * | 3/2009 | Kashibuchi | 358/1.2 |

FOREIGN PATENT DOCUMENTS

| JP | 5-81399 | 4/1993 |
|---|---|---|
| JP | 2005-159517 | 6/2005 |

* cited by examiner

*Primary Examiner* — King Poon
*Assistant Examiner* — Allen H Nguyen
(74) *Attorney, Agent, or Firm* — Fitzpatrick, Cella, Harper & Scinto

(57) ABSTRACT

An information processing apparatus separates an object from image data of a read document to allow the object to be reused, the apparatus and includes: a storing unit for storing a relative relationship between an object and the other objects included in the document in metadata as a first characteristic amount when the object is separated from the image data of the read document; a designating unit for receiving a designation of a size of a document to which the object is outputted and a designation of observation distance setting; an enlargement/reduction processing unit for performing enlargement/reduction processing on the stored object on the basis of the metadata and a second characteristic amount defined according to the size of the document and the observation distance setting; and a pasting unit for pasting the object subjected to the enlargement/reduction processing into image data of the document.

7 Claims, 20 Drawing Sheets

| DOCUMENT SIZE | OBSERVATION DISTANCE | | | | | | | |
|---|---|---|---|---|---|---|---|---|
| | GENERAL DOCUMENT | | POSTER | | USER SETTING | | - (PAGE DEFAULT) | |
| | OBJECT SIZE | FONT SIZE | OBJECT SIZE | FONT SIZE | OBJECT SIZE | FONT SIZE | OBJECT SIZE | FONT SIZE |
| POSTCARD | 16 | 10 | 35 | 30 | 100 | 20 | – | – |
| A4 | 35 | 10 | 50 | 30 | 120 | 30 | – | – |
| A3 | 40 | 12 | 85 | 50 | 200 | 60 | – | – |

| DOCUMENT SIZE | OBSERVATION DISTANCE | | | | | | | | | | | |
|---|---|---|---|---|---|---|---|---|---|---|---|---|
| | GENERAL DOCUMENT | | | POSTER | | | USER SETTING | | | - (PAGE DEFAULT) | | |
| | FONT SIZE | | | FONT SIZE | | | FONT SIZE | | | FONT SIZE | | |
| | HEADER | MAIN BODY | FOOTER | HEADER | MAIN BODY | FOOTER | HEADER | MAIN BODY | FOOTER | HEADER | MAIN BODY | FOOTER |
| POSTCARD | 14 | 10 | 8 | 30 | 24 | 12 | 20 | 20 | 20 | 20 | 20 | 20 |
| A4 | 20 | 12 | 10 | 42 | 30 | 18 | 30 | 30 | 30 | 30 | 30 | 30 |
| A3 | 24 | 12 | 10 | 64 | 50 | 24 | 50 | 50 | 50 | 50 | 50 | 50 |

INFORMATION PROCESSING APPARATUS, INFORMATION PROCESSING METHOD, AND PROGRAM AND STORAGE MEDIUM THEREFOR

BACKGROUND OF THE INVENTION

1. Field of the Invention

The present invention relates to a technique of editing object data obtained by separating an object from document image data obtained by reading a document.

2. Description of the Related Art

In recent years, along with the digitalization of internal image processing, copying machines have been provided with a rapidly-increasing number of functions. To give examples of basic functions, there is a SEND function of sending a document outside of a copying machine via a network, as well as a copy function of copying a, document and a PDL (page description language) function of printing a document created by a host computer.

In addition to these, the recent copying machines have numerous functions including a BOX function that makes it possible to store a document image created by the copy function or the PDL function in the copying machine and to reuse the stored image, and an edit function, such as combining or binding that uses the document image stored in the copying machine by the BOX function.

On the other hand, users demand a higher image quality, and as a result, to reproduce a document with high precision, the image processing resolution in copying machines keeps increasing from 600 dpi to 1200 dpi, and to 2400 dpi, and the number of signal bits also keeps increasing from 8 bits to 10 bits, and to 12 bits. For this reason, an increase in the costs of devices and an increase in development costs due to the addition of a memory or storage or replacement of a CPU with a higher performance CPU for handling bitmap data for internal processing are now not ignorable.

Under such circumstances, a technique has been developed in which a document read by an image processing apparatus is divided into areas on an object basis, and each of the objects included in the document is converted into data in a format to be described later, and thereafter a user uses an edit function (Japanese Patent Laid-Open No. 2005-159517). In this example, the objects included in the document are classified according to attributes such as a TEXT, a GRAPHIC, and an IMAGE. The objects having the TEXT or GRAPHIC attribute are vectorized to generate vector data and the objects having the IMAGE attribute are converted into JPEG (Joint Photographic Experts Group) data. The function of editing the thus converted data is provided to the user. In the foregoing technique, the image processing apparatus does not have to handle bitmap data having an extremely large amount of information, that is, bitmap data having high resolution and a large number of bits. Further, by using vector data that can be easily edited and deformed, it is possible to expect a reduction in costs and an improvement in user operability.

One example of an edit function in the document creating apparatus, such as a word processor or the like, is the inputting of image data, such as a photograph and an illustration, into a document using an image reading apparatus, such as an image scanner or the like.

Further, in a case where image data is fetched and placed into the document, the magnification of the image data is specified at the time of pasting (combining) a cut area specified by a user to the document directly. Alternatively, the apparatus automatically enlarges/reduces data according to the size of the document in which the cut area is pasted. This enables the user to perform editing operations through an image input more efficiently in a simple procedure (Japanese Patent Laid-Open No. 5-81399 (1993)).

In the aforementioned existing techniques, the read document is divided on an object basis and each of the divided objects is appropriately converted into either vector data or JPEG data, thereby making it possible to improve the operability of an edit function. However, the small UI and the simple operation means in the copying machine do not provide sufficient operability for the user to select an enlargement/reduction ratio and to specify an object size to be pasted every time when the object is pasted. Accordingly, there is a problem in which operability is still inefficient when the user fetches a document image and edits it.

SUMMARY OF THE INVENTION

The present invention has been made in view of the aforementioned circumstances and an object of the present invention is to automatically calculate the optimum magnification for each of the objects from a first characteristic amount of an object obtained at the time of the object division and a second characteristic amount regarding a document which is being edited, and to paste the object.

In order to solve the aforementioned problems, an information processing apparatus of the present invention separates objects from image data of a read document to allow the objects to be reused. The information processing apparatus includes: storing means for storing in metadata a relative relationship between an object and the other objects included in the document as a first characteristic amount when the object is separated from image data of the read document; designating means for receiving designation of a size of a document to which the object is outputted and designation of an observation distance setting; an enlargement/reduction processing means for performing enlargement/reduction processing on the stored object on the basis of the metadata and a second characteristic amount defined according to the size of the document and the observation distance setting; and pasting means for pasting the object subjected to the enlargement/reduction processing into image data of the document.

According to the present invention, the information processing apparatus can automatically calculate the optimum magnification for each of the objects from a first characteristic amount of an object obtained at the time of the object division and a second characteristic amount regarding a document which is being edited, and then can paste the object. In other words, in a case where the object before the division is large in the document as compared with the other objects, the size ratio of the object with respect to the other objects can be maintained even if the object is edited and pasted into the document. Therefore, at the time of enlarging or reducing an object, it is possible to paste the object into another document, while the intention of the user who has created the object is reflected. As a result, it is possible to edit and paste the object efficiently even with a small UI and the simple operation means in the copying machine, thus allowing improvement in user convenience.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a view showing one example of a table that relates a page object size and a page font size to a document size and observation distance setting according to the first embodiment;

FIG. 20 is a table that relates a font size used in enlargement/reduction processing to a document size, observation distance setting and classification information of a document structure according to the second embodiment.

DESCRIPTION OF THE EMBODIMENTS

First Embodiment

A first embodiment of the present invention will be described in detail below with reference to the drawings. This embodiment is implemented by an image processing apparatus which is an information processing apparatus.

Figure 1:
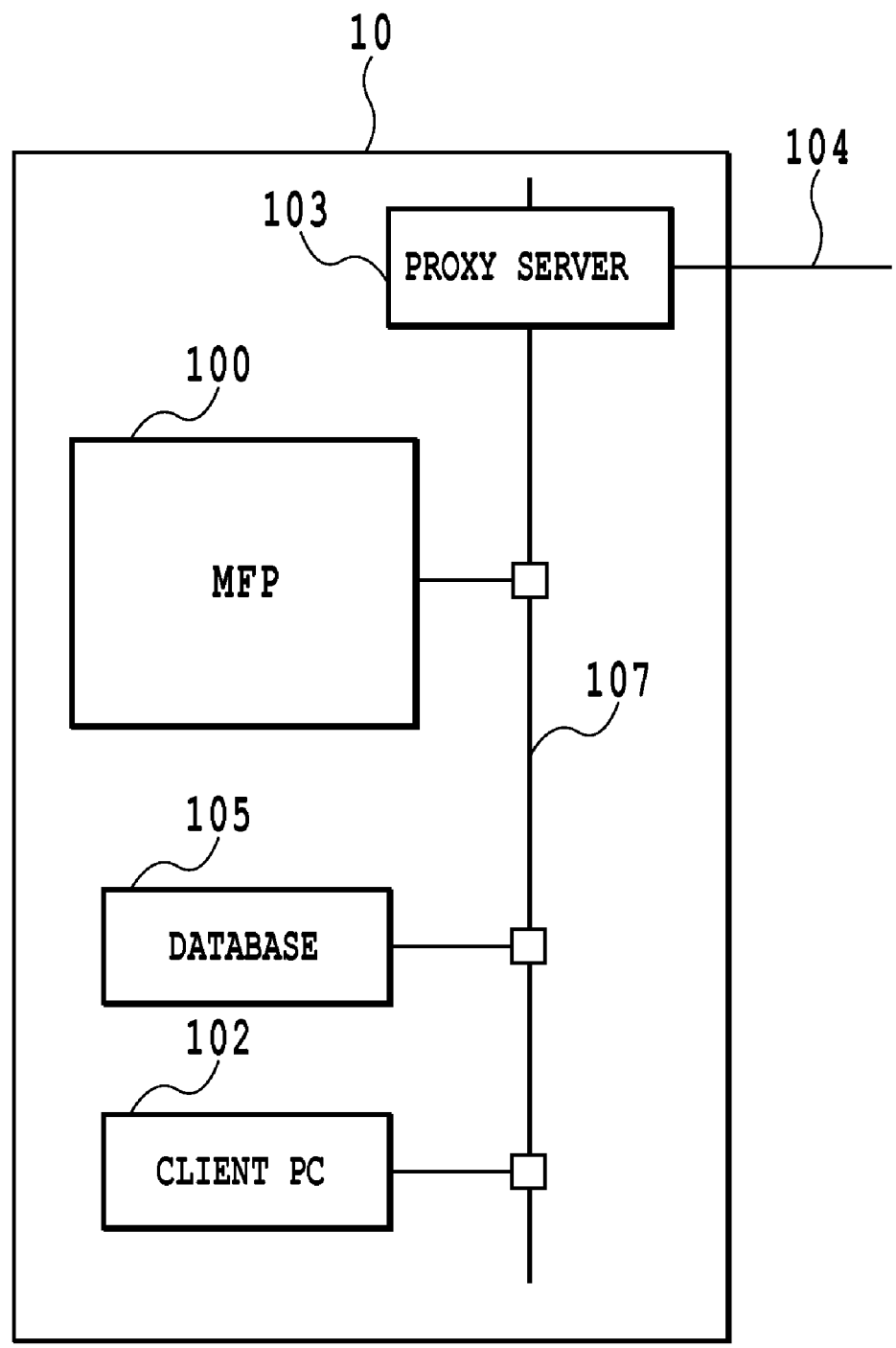
FIG. 1 is a block diagram showing a configuration of an image processing system according to a first embodiment of the present invention.

FIG. 1 is a block diagram showing a configuration of an image processing system of the first embodiment.

The image processing system is implemented in an environment in which an office 10 is connected via a network 104, such as the Internet and the like. A multifunction peripheral (MFP) 100, a client PC 102 using the MFP 100, a database 105, and a proxy server 103 are connected to a local area network (LAN) 107 constructed in the office 10. Incidentally, the MFP 100 is a copying machine that performs multiple functions (a copy function, a print function, a transmission function, and the like). The LAN 107 in the office 10 is connected to the network 104 via the proxy server 103 provided in each office.

It should be noted that the configuration shown in FIG. 1 is merely one example, and the number of offices 10 may be two or more. As the network 104, typically, any of the Internet, a LAN, a wide area network (WAN), a telephone line, a dedicated digital line, an asynchronous transfer mode (ATM) line, a frame relay line, a communication satellite line, a cable television line, a radio communication line for data broadcasting and the like can be used. Alternatively, the network 104 may also be a so-called communications network that is implemented by a combination of these lines, and any network may be used as long as it can transmit and/or receive data.

Each of various types of terminals as the client PCs 102 includes standard components (for example, a central processing unit (CPU), a random access memory (RAM), a read-only memory (ROM), a hard disc, an external storage device, a network interface, a display, a keyboard, a mouse and the like) provided in a general purpose computer.

Figure 2:
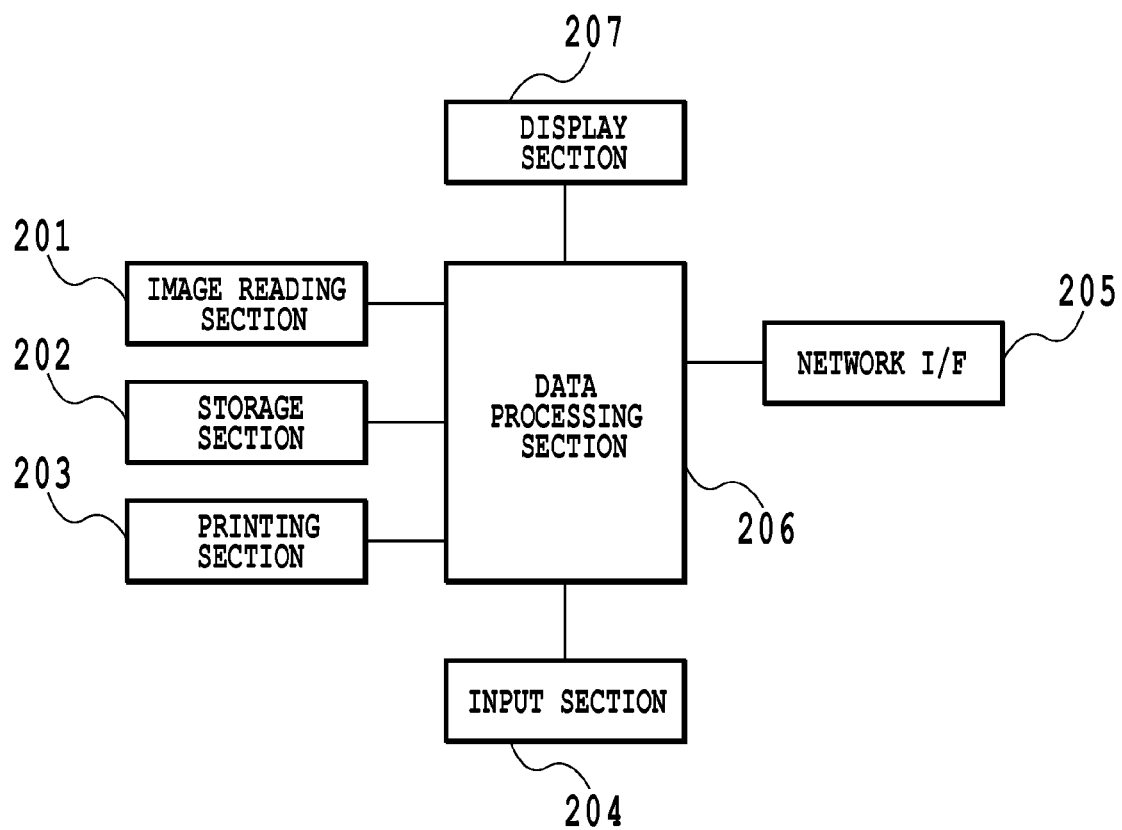
FIG. 2 is a block diagram showing a specific configuration of an MFP according to the first embodiment of the present invention.

A description will be next given of a specific configuration of the MFP 100 with reference to FIG. 2.

FIG. 2 is a block diagram showing a specific configuration of the MFP according to the first embodiment of the present invention.

An image reading section 201 shown in FIG. 2 irradiates images on a batch of documents or on a document with light from a light source (not shown), and focuses the images reflected through a lens on a solid-state image sensing device. Then, the image reading section 201 obtains a read image signals as bitmap data having a predetermined resolution (600 dots per inch (dpi), or the like) from the solid-state image sensing device. Note that, the image reading section 201 includes an automatic document feeder (ADF).

The MFP 100 has a copy function of printing an image corresponding to the read image signal on a recording medium in a printing section 203. When a document image is copied on a recoding medium, a data processing section 206 performs image processing on a read image signal from the image reading section 201 to generate a recording signal, and the recording signal is printed on the recording medium in the printing section 203. On the other hand, when multiple document images are copied, the recording signals corresponding to one page are temporarily stored in a storage section 202, and are then outputted to the printing section 203 sequentially so as to be printed on the recording medium.

Moreover, as a communication function via a network I/F 205, the MFP 100 converts bitmap data obtained from the image reading section 201 into object data by processing to be described later so as to transmit the object data to the database 105. Further, the MFP 100 receives the object data stored in the database 105 for the purpose of reusing, or converts the object data into an image file in a vector data file format such as an XML paper specification (XPS) format, a portable document format (PDF), or the like and forwards the resultant file to the client PC 102.

For example, the data processing section 206 receives print data outputted from the client PC 102 via the network I/F 205. Then, the data processing section 206 converts the print data into a recording signal, which is printable by the printing section 203, and outputs the recording signal to the printing section 203, thereby forming an image on a printing medium.

Operator's instructions to the MFP 100 are given through an input section 204 provided in the MFP 100, and operations to be performed in response to these instructions are controlled by a control section (not shown) provided in the data processing section 206. Moreover, a status of the operator's input and image data during processing are displayed in a display section 207.

Further, the storage section 202 has a storage area where object data obtained by processing to be described later is stored and an area where a second characteristic amount for a document size and observation distance setting to be described later is stored in the form of a table. Furthermore, in the data processing section, an image processing buffer used in processing various types of images, and an image editing buffer are also provided. In the image editing buffer, data obtained by copying the object data in the case of performing image editing operations on the basis of the object data is stored as image editing data.

[Outline of Processing]

Figure 3:
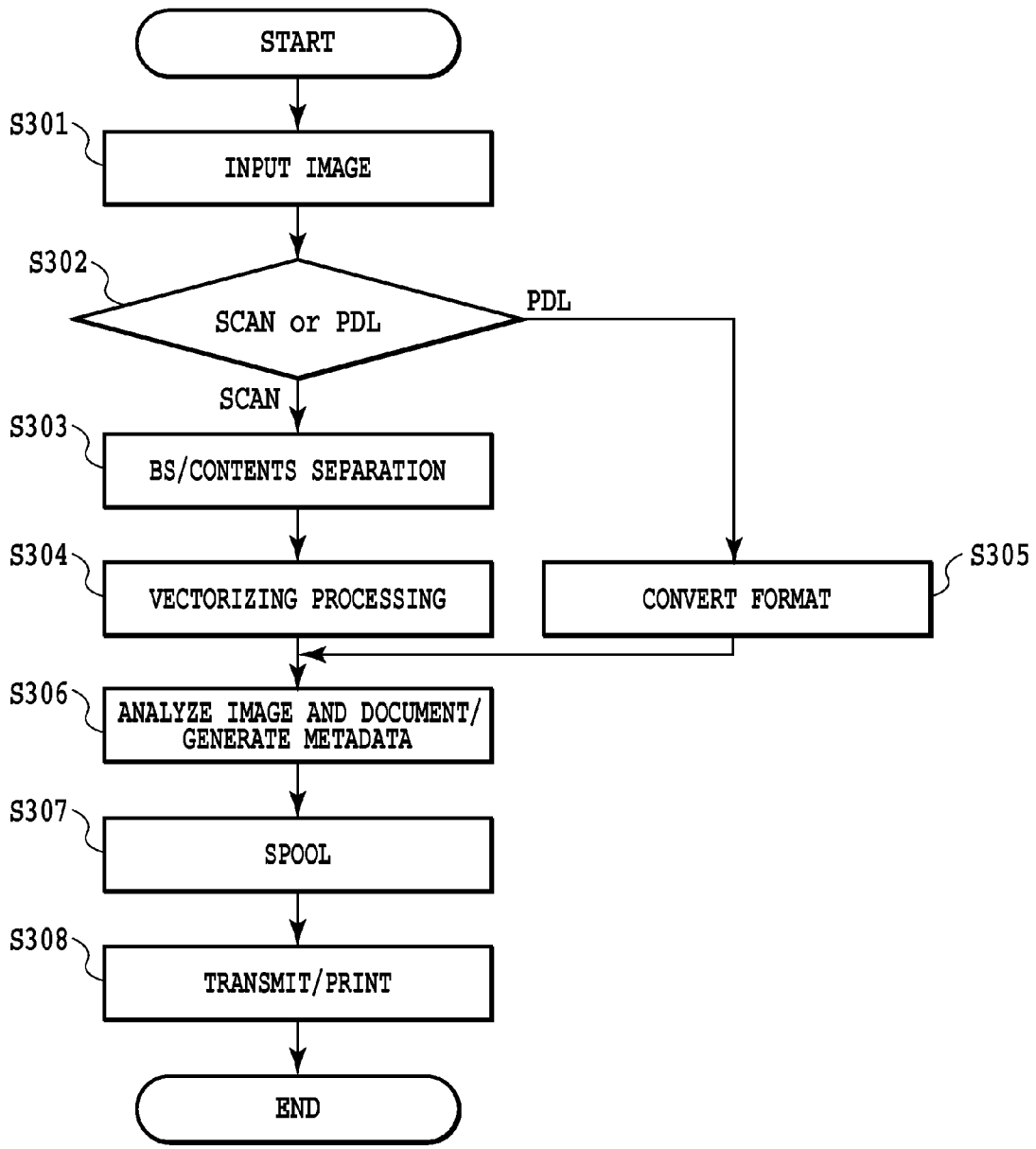
FIG. 3 is a flowchart showing the entire outline of processing performed by the image processing system according to the first embodiment.

A description will be next given of the outline of the entire processing performed by the image processing system according to the first embodiment with reference to FIG. 3.

FIG. 3 is a flowchart showing the outline of the entire processing performed by the image processing system. All operations are controlled by the control section (not shown) of the image processing apparatus.

First, in step S301, an image is inputted. In a case where the input process is performed as a scan job, the image reading section 201 of the MFP 100 scans and reads a document in a bit-mapped form, and obtains an image signal of, for example, 600 dpi 8 bits per pixel. The data processing section 206 performs preprocessing on the image signal, and stores the resultant image signal as image data (bitmap data) for one page in the storage section 202. In a case where the input process is performed as a PDL job using a page description language code (hereinafter referred to as a PDL code), the data processing section 206 stores image data (vector data) for one page in the form of a PDL code.

Next, in a case where the input process is performed as the scan job (determination of the scan in step S302), the data processing section 206 performs block selection (BS) to perform contents separation processing in step S303. Specifically, the data processing section 206 first divides an image signal to be processed, which is stored in the storage section 202, into a character/line area and a half-tone image area. The data processing section 206 further divides the character/line area into blocks, each of which is treated as a paragraph, or into tables and figures consisting of lines, and converts them to objects.

On the other hand, the data processing section 206 further divides the half-tone image area into so-called objects (blocks), such as image parts or background (background for the image) parts divided into square blocks, which are independent from one another. It should be noted that, in this embodiment, TEXT (character), GRAPHIC (fine line, diagram, table), and IMAGE (image) are taken as examples of attributes, but the types of attributes are not limited to these. It is needless to say that other types of attributes may be used, depending on the application or purpose, and all of the attributes do not necessarily have to be used.

Next, in step S304, each of the separated objects is vectorized. In the vectorizing, first, character recognition is performed on each of the objects determined as a TEXT attribute (text attribute) by an optical character recognition (OCR) and sizes, styles, and fonts of characters are further recognized, and the recognized data is converted into font data visibly faithful to characters obtained by scanning the document. On the other hand, each of the objects of a table or diagram formed of lines, which is determined as a GRAPHIC attribute (graphic attribute) is outlined. Moreover, each of the objects of an image determined as an IMAGE attribute (image attribute) is subjected to JPEG compression individually.

Vectorizing for these types of objects is performed on the basis of the attributes of the objects. The vectorized objects are stored as object data in a format which includes metadata to be described later and image information (image data) which can be used in the MFP 100. Furthermore, layout information of each of the objects is also included in the corresponding object data and stored.

Next, in a case where the input process is performed for a PDL code (determination of the PDL in step S302), the inputted PDL code is converted (format converted) into object data to be described later for each of the objects to be stored in step S305. In this case, attribute data (for example, TEXT, GRAPHIC, IMAGE and the like) included in the PDL code, metadata and layout information are similarly converted to be stored.

The metadata mentioned here includes information on the object such as an object characteristic and a name, and information on a first characteristic amount to be used in paste processing to be described later, the first characteristic amount representing a relative relationship between the object and the other objects in the document. The first characteristic amount, which represents the relative relationship between the object and the other objects in the document, includes an average object size to be described later and the object size of the relevant object, an average font size and the font size of the relevant object.

Next, in step S306, an image analysis and a document analysis are performed on each of the objects to modify the metadata generated in steps S304 and S305 and to add new information. Meanwhile, there is a difference between object information (object data) generated in the SCAN job and that generated in the PDL job. Accordingly, in this embodiment, three attributes of TEXT, GRAPHIC and IMAGE are applied to any job, and in a case of image data having the same attribute, the following processing is performed so as not to have any difference, regardless of the type of job. Further, in a case where the attribute of the object is TEXT, the document contents are summarized on the basis of the result of the document analysis. On the other hand, in a case where the attribute of the object is GRAPHIC, an image analysis is performed to obtain more detailed information on its characteristic amount, its name, the types of diagram and line in the GRAPHIC, and the like. Meanwhile, in a case where the attribute of the object is IMAGE, an image analysis is performed to obtain more detailed information on its characteristic amount, its name, and characteristics that indicate, for example, whether the IMAGE is laid out as a portrait or a landscape, and the like. Then, the information thus obtained is added to metadata. Note, however, that the above information to be added to the metadata is merely an example, and the present invention is not limited to the above. Any information may also be added as long as information relates to the objects.

Subsequently, in step S307, the object data obtained by the above-described steps up to step S306 is spooled in the storage section 202 and, at the same time, is stored in the storage section 202 or database 105 in a reusable state. It should be noted that the object data does not necessarily have to be registered at the time of storage. Alternatively, whether or not to register the object data can be determined by another determination processing in which, for example, object data is not registered if object data overlapped with or similar to the relevant data has been already registered in the storage section 202.

Next, in step S308, transmission processing and printing processing to be described later are carried out. For registering the data in the storage section 202 or database 105 only, processing is terminated without the transmission processing and printing processing being performed.

[Transmission Processing]

Figure 4:
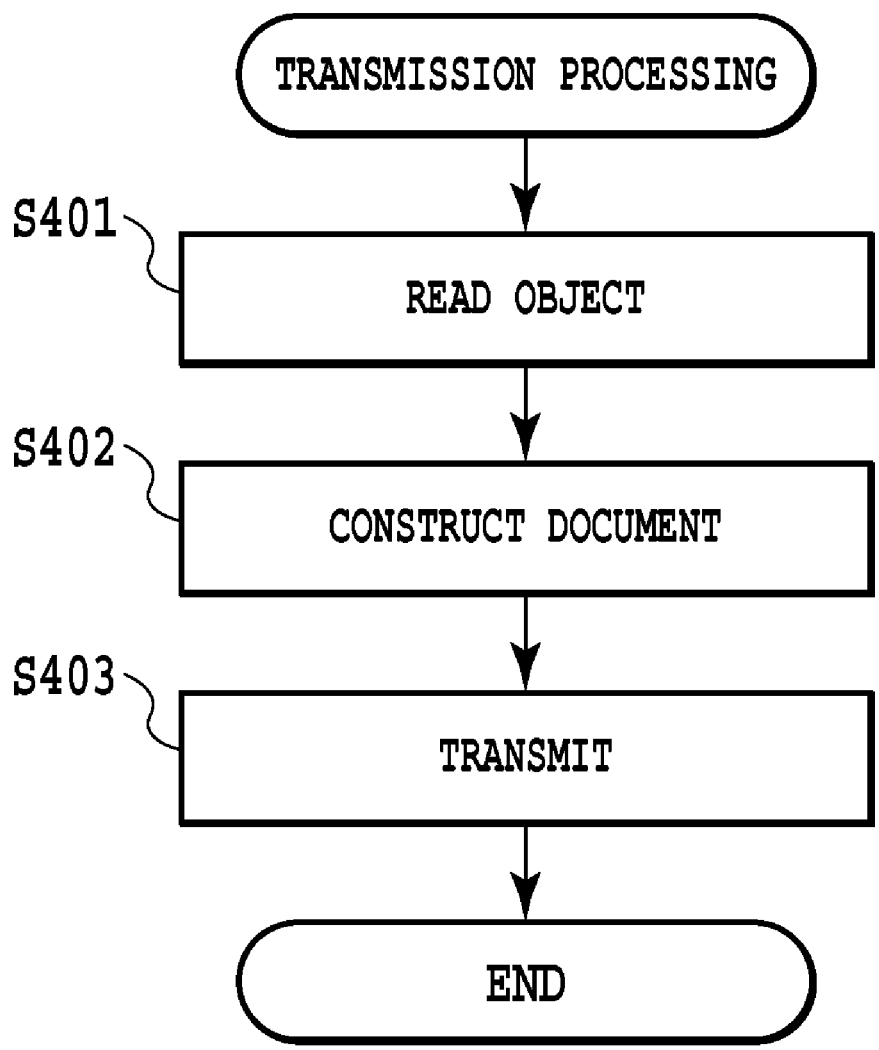
FIG. 4 is a flowchart showing the outline of transmission processing according to the first embodiment.

A description will be next given of the outline of transmission processing to be performed by the image processing system according to the first embodiment with reference to FIG. 4.

FIG. 4 is a flowchart showing the outline of the transmission processing according to the first embodiment. All operations are controlled by the control section (not shown) of the image processing apparatus.

First, in step S401, object data spooled in the storage section 202 is read out.

Next, in step 402, document information, which is print information, is constructed on the basis of layout information that the object data which has been read out in step S401 has.

After that, in step S403, the constructed document information is converted into a certain external format and the converted document information is transmitted to a destination via the network I/F 205. The external format mentioned here denotes, for example, a tag image file format (TIFF) and a JPEG format, which are bitmap formats, and a PDF format and an XPS format, which are vector formats.

[Printing Processing]

Figure 5:
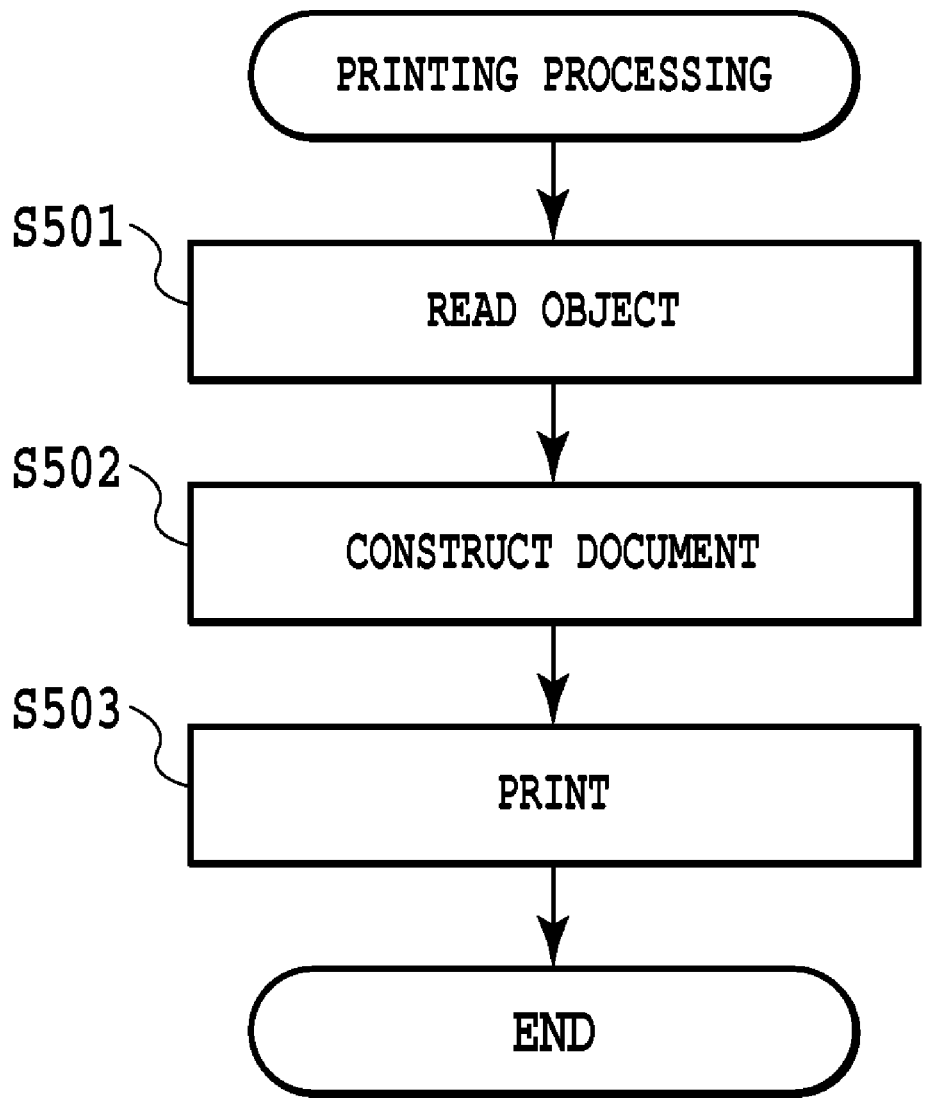
FIG. 5 is a flowchart showing the outline of printing processing according to the first embodiment.

A description will be next given of the outline of printing processing to be performed by the image processing system according to the first embodiment with reference to FIG. 5.

FIG. 5 is a flowchart showing the outline of the printing processing according to the first embodiment. All operations are controlled by the control section (not shown) of the image processing apparatus.

First, in step S501, object data spooled in the storage section 202 is read out.

Next, in step S02, print data is constructed on the basis of layout information oft the object data which has been read out in step S501.

After that, in step S503, the print data formed in step S502 is converted into a recording signal which is printable in the printing section 203, and then the converted recording signal is outputted to the printing section 203 by which an image is formed on a printing medium.

[Object Data and Metadata]

Figure 6:
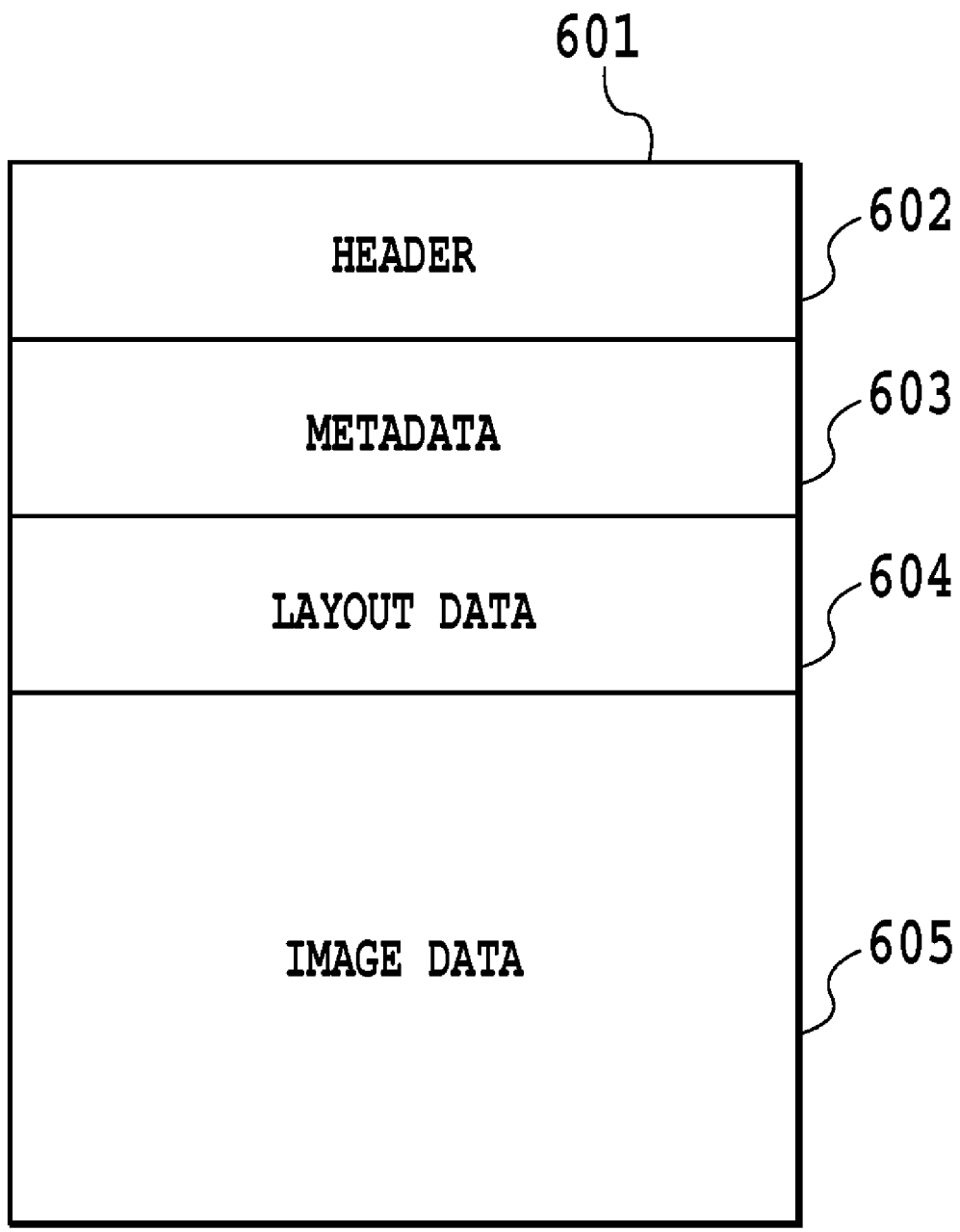
FIG. 6 is a view showing one example of an object data structure according to the first embodiment.
Figure 7:
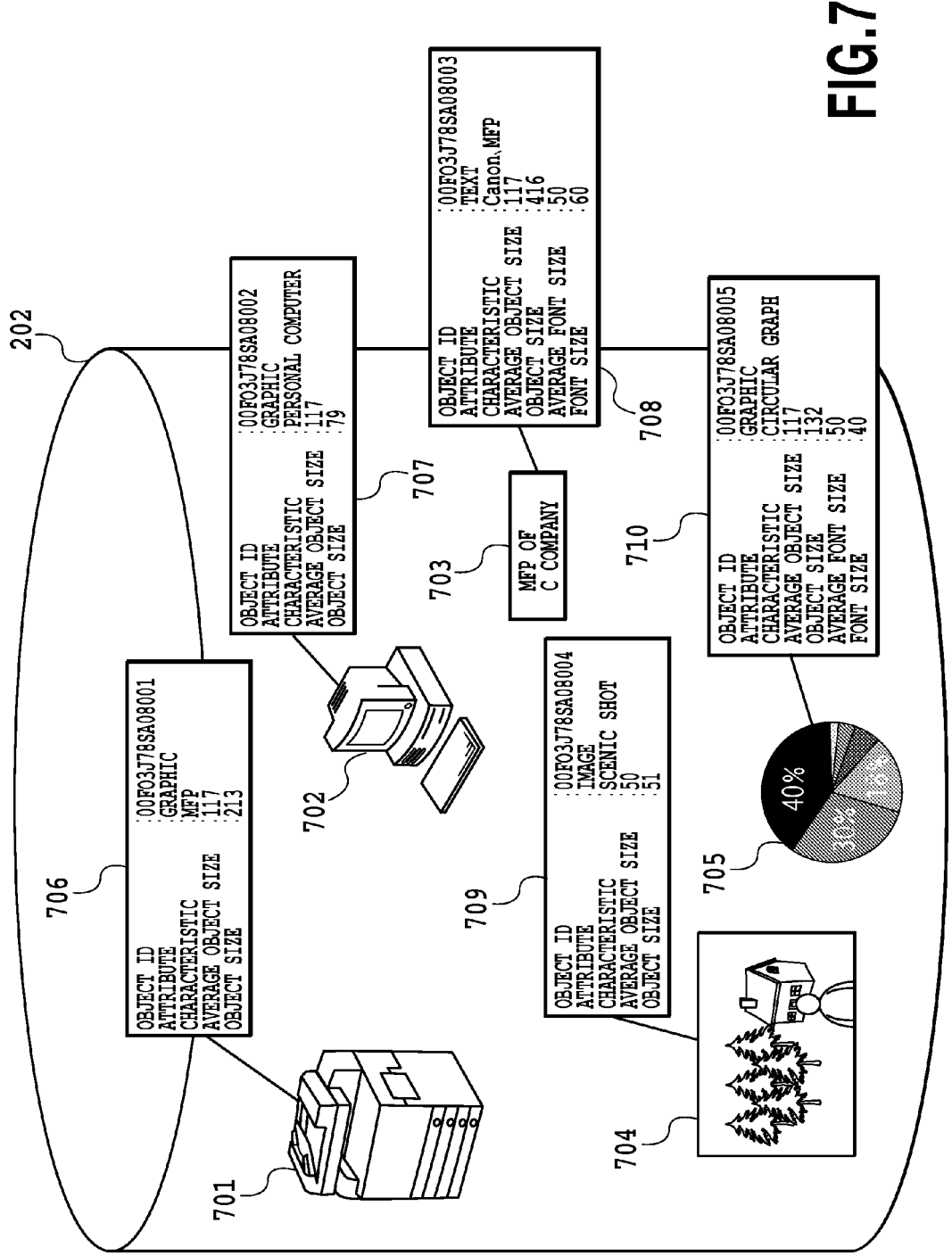
FIG. 7 is a conceptual view showing one example of object data registered or spooled in a storage section and metadata according to the first embodiment.

A description will be next given of object data and metadata with reference to FIGS. 6 and 7.

FIG. 6 is a view showing one example of an object data structure according to the first embodiment.

Object data 601 comprises a header 602, metadata 603, layout data 604, and image data 605.

The header 602 stores therein an object size, such as a width and a height of object data, and a data format, such as a bitmap format or a vector format. The metadata 603 stores therein information on an attribute of an object, information to be used in searching and editing, and information on object data such as an object ID. The layout data 604 stores therein information representing a position of an object itself in a document. The image data 605 is actual data of the object and is expressed in a bitmap format or a vector format indicated in the header.

FIG. 7 is a conceptual view showing an example of object data and its corresponding metadata, which are registered or spooled in the storage section 202 according to the first embodiment.

In the storage section 202, object data 701, 702, 703, 704 and 705 are stored as an example. Moreover, each of the object data has its corresponding metadata 706, 707, 708, 709, and 710. Each of the metadata 706, 707, 708, 709, and 710 includes an object ID, an attribute of object data, and a characteristic (or type) of object data. Furthermore, each of the metadata includes information on the relative relationship between the corresponding object and the other objects in the document to be described later, the information including an average object size and the object size of the corresponding object, and an average font size and the font size thereof in a case where font data is included in the metadata.

It should be noted that IDs are uniquely assigned to all object data as the object IDs.

[Edit Function]

Figure 8:
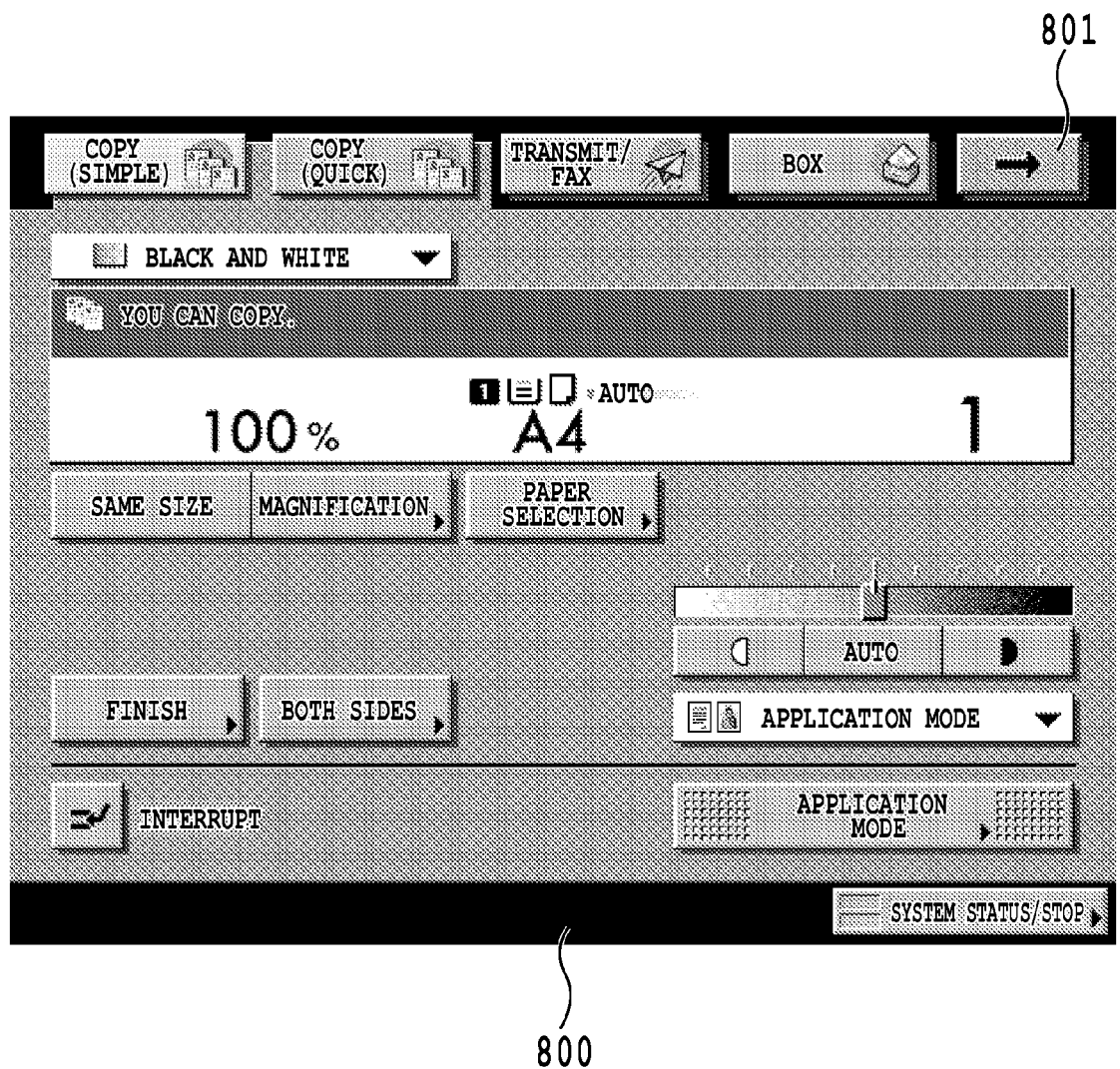
FIG. 8 is a view showing one example of an operation screen according to the first embodiment.
Figure 9:
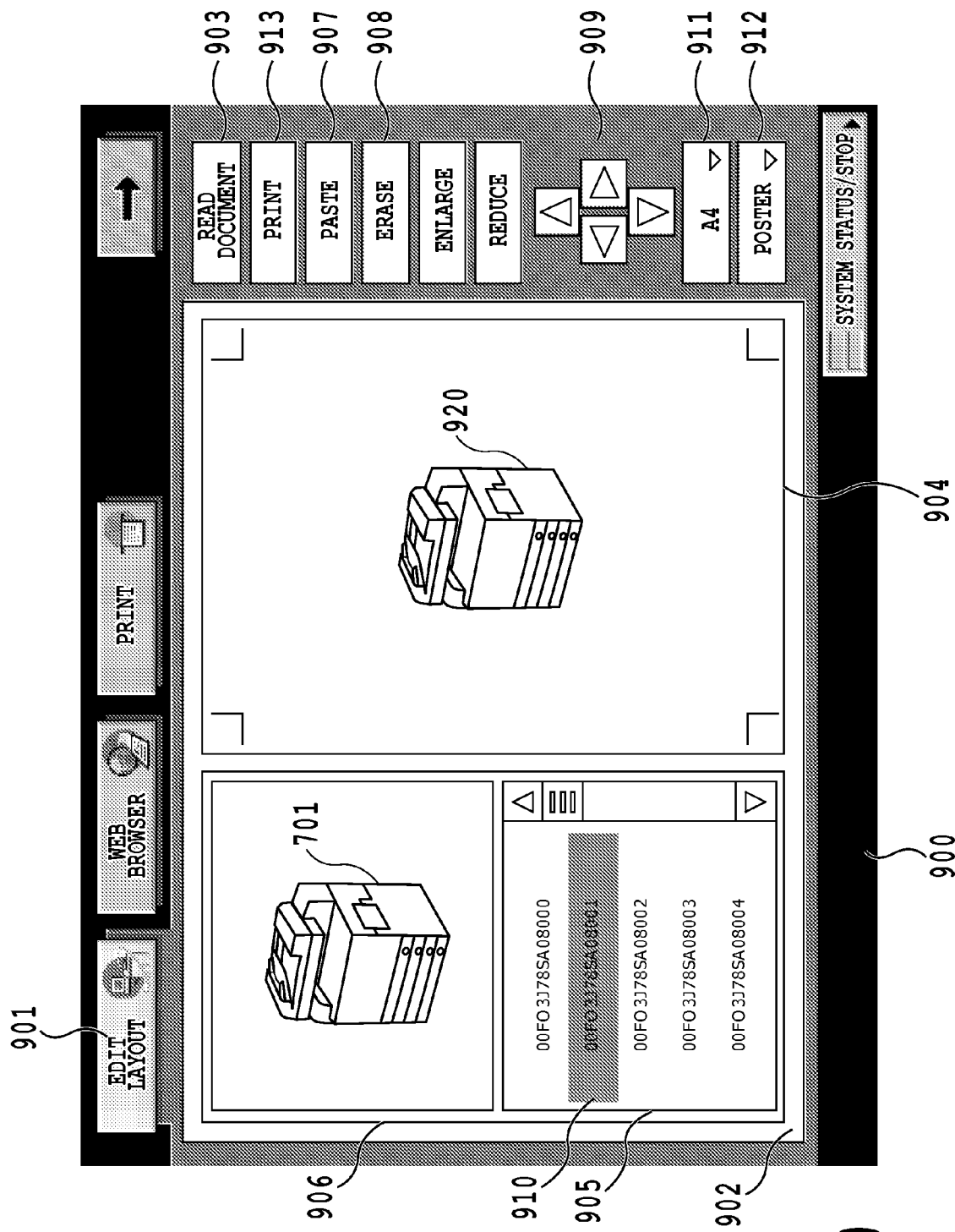
FIG. 9 is a view showing one example of an extended function operation screen according to the first embodiment.

A description will be next given of the outline of an edit function according to the first embodiment with reference to FIGS. 8 and 9.

FIGS. 8 and 9 are views each showing an example of an operation screen according to the first embodiment. This operation screen is an example of the operation screen particularly configured by the input section 204 and the display section 207.

An operation screen 800 is configured by forming the input section 204 and the display section 207 integrally. In this embodiment, it is assumed that the input section 204 and the display section 207 are configured by a liquid crystal display (LCD) and a touch panel, respectively. Naturally, the operation screen 800 may be configured so that the input section 204 is a hard key or a mouse pointer, and the display section 207 is a CRT independently. Various functions are selected or specified by the user via the operation screen.

The operation screen 800 in FIG. 8 is a basic operation screen of the MFP 100. For selecting various functions implemented by the first embodiment, an extended function key 801 is used in the example of the operation screen 800.

When the user presses the extended function key 801, the operation screen 800 that has received a signal obtained by this pressing is changed to an extended function screen 900 in FIG. 9. The extended function screen 900 in FIG. 9 displays the various functions which are prepared as extended functions in the MFP 100 so that the user can select these functions. When the user presses an edit layout key 901 on the extended function screen 900, an edit layout screen 902 is displayed by this pressing.

A document reading key 903 on the edit layout screen 902 is a key for reading a document. When the document reading key 903 is pressed, the aforementioned processing shown in the flowchart in FIG. 3 is performed, so that the read result is displayed on a preview screen 904. Here, object data 920, obtained by dividing an image into objects and vectorizing the objects by way of the processing shown in FIG. 3, is reconfigured on the basis of the layout data 604 and displayed on the preview screen 904. It should be noted that the following processing may be performed even when the document reading key is not pressed.

On the edit layout screen 902, an object list screen 905 displays a list of object IDs as information of the object data registered or spooled in the storage section 202 and the database 105. On the other hand, when a certain object data is selected by the user through the object list screen 905, the image data 605 of the selected object registered or spooled in the storage section 202 is drawn on an object preview screen 906. Then, the user checks the content of the object data through the object preview screen 906. It should be noted that information on the object data to be displayed in a list on the object list screen 905 is not limited to the object ID. Alternatively, part of the metadata 603 or the image data 605 itself may also be employed.

Upon pressing a paste button 907, the certain object data selected through the object list screen 905 is pasted into a document during editing by way of paste processing to be described later. The resultant data is displayed on the preview screen 904. Moreover, the pasted object data and the object data in the document can be erased from the document when an erase button 908 is pressed after the object data is selected through the preview screen.

Further, when a move button 909 is pressed by the user after a certain object data is selected through the preview screen, the object data can be moved to any position. Furthermore, when a print button 913 is pressed, the foregoing printing processing is performed on the basis of the object data being displayed on the object preview screen 906.

[Calculation of Characteristic Amount on Observation Distance Setting]

Figure 10:
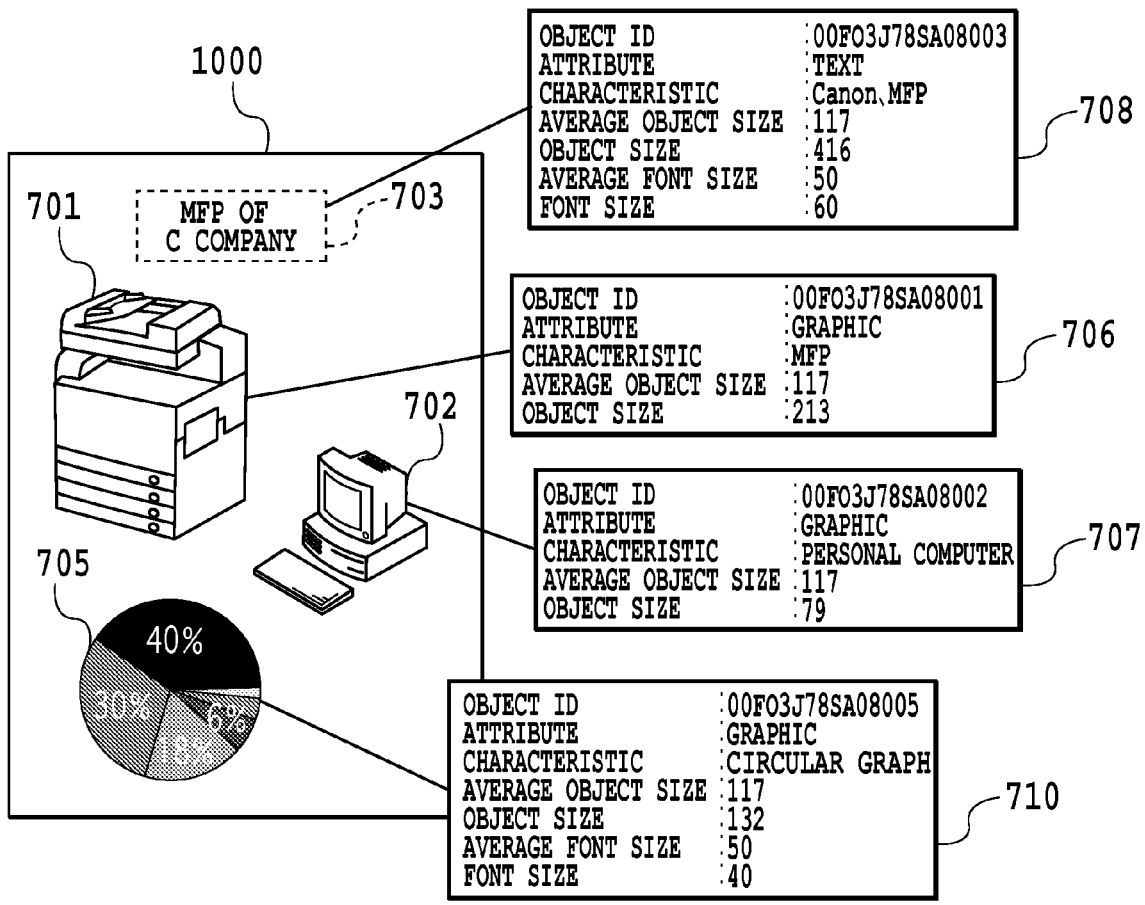
FIG. 10 is a conceptual view showing one example of object data and an original document used in the first embodiment.

A description will be next given of a method for calculating a first characteristic amount, representing a relative relationship between an object and the other objects in a document, of the foregoing metadata with reference to FIG. 10.

FIG. 10 is a conceptual view showing one example of object data stored in the storage section 202 after a document being read in advance and an original document subjected to the reading.

A document 1000 is a document of A3 size (29.7 cm×42 cm), and when an image is read out according to a flow in FIG. 3, the object data 701, 702, 703, and 705 are generated in steps S303 and S304. After that, the metadata 603 is generated for each of the object data in step S306. At this time, a first characteristic amount, representing a relative relationship between an object and the other objects in the document to be used in the paste processing to be described later, is calculated as part of the metadata 603. Here, for each of the metadata, an average object size and the object size of the corresponding object is calculated as the first characteristic amount. In addition to this, when font data is included, an average font size and the font size of the corresponding object is further calculated for each of the metadata. The calculated data are respectively included in the metadata 603 and stored in the storage section 202 in step S307.

In this embodiment, the foregoing object size indicates a size for each of the objects and is recorded as a value obtained by multiplying a height (cm) of the object by a width (cm) thereof. Moreover, the foregoing font size indicates a font size for each of the objects and a font size (Pt) in the object is recorded. Further, the average object size and the average font size respectively indicate an average value of all object sizes and that of all font sizes included in one page at the time of reading the document. Accordingly, these values are common among the object data present in the same document. It should be noted that the font size and average font size are available only for the object data including font data such as a text, graphics (diagram) or the like.

In this embodiment, the object size is defined as a square measure obtained by multiplying the height of the object by the width thereof. However, it may be possible to use, for example, the height, the width and the length of a diagonal line of the object. In the above description, the average value of all the object sizes is obtained so as to determine a ratio of each of the object sizes relative to the average size of all the objects in the document. In other words, by comparing the size of the object in the document with the average size of the objects, it is possible to obtain information on the size ratio of area which the object occupies in the document. By storing this information in the metadata, in determining a scaling ratio of the object at the time of editing, the object can be pasted into a document in a state where a relative size ratio of the object in the document read before editing is maintained.

[Details on Paste (Combine) Processing]

Figure 11:
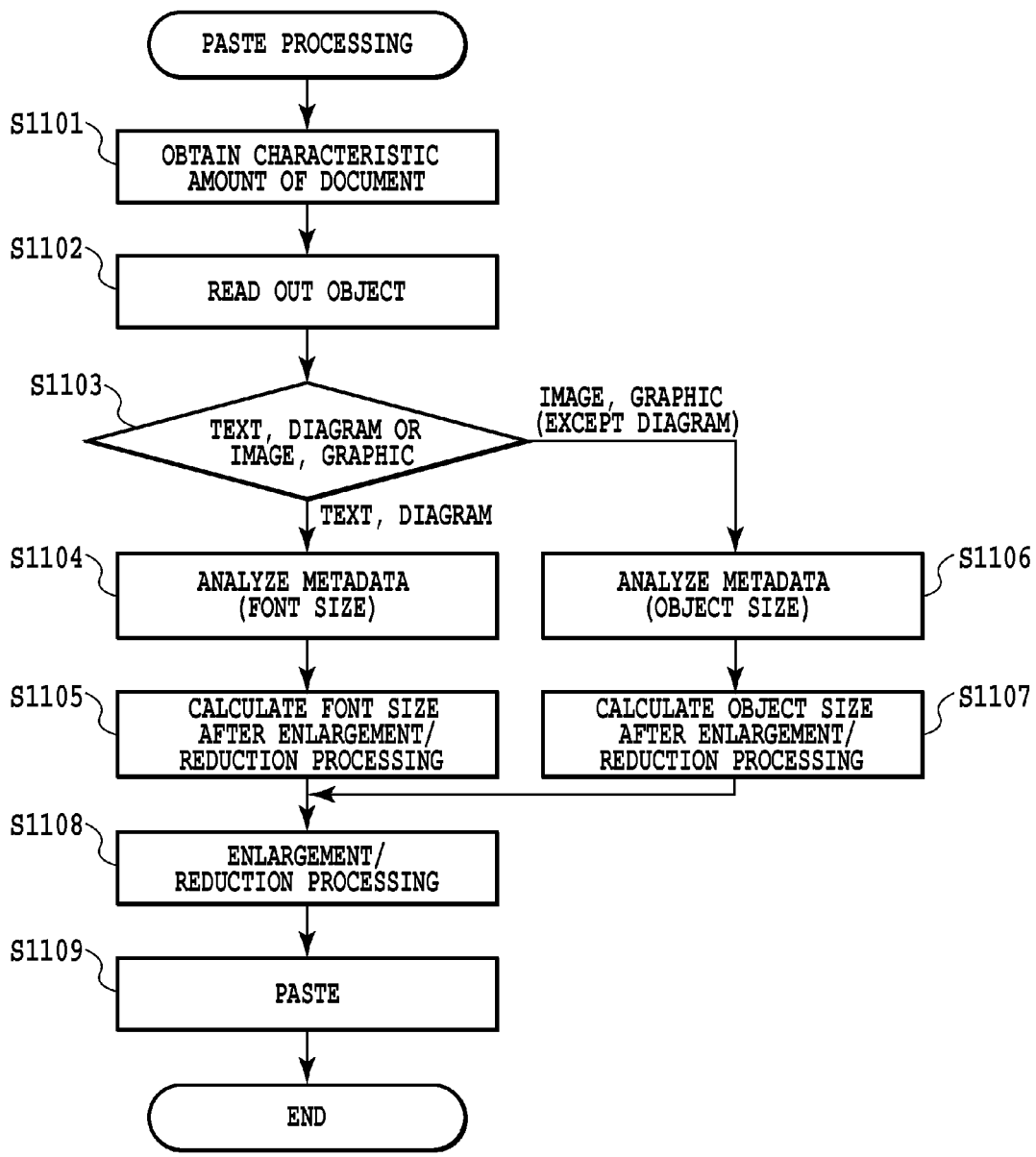
FIG. 11 is a flowchart of paste processing according to the first embodiment.

A description will be next given of details on the foregoing paste processing according to the first embodiment with reference to FIG. 9 and FIGS. 11 and 12.

FIG. 11 is a flowchart of paste processing including enlargement/reduction processing. All operations are controlled by the control section (not shown) of the image processing apparatus.

When any object ID is selected from the object list 905 on the edit layout screen 902, shading 910 is applied on the display of the selected ID and a preview of the relevant object data is displayed on the object review screen 906. Here, the object data 701 is selected as an example. When the paste button 907 is pressed in this state, in step S1101, a second characteristic amount is obtained from a table shown in FIG. 12 to be described later, the second characteristic amount being obtained according to a document size and observation distance setting to be described later. In this embodiment, a "page object size" and a "page font size" to be described later are used as the second characteristic amount. The "page object size" is a standard size of the object in a page of a document suitable for the user to observe the document. Moreover, this can also be said as an average size suitable for an object in the document. Likewise, the "page font size" is a standard size of the font in a page of a document suitable for the user to observe the document. Similarly, this can also be said as an average size suitable for a font in the document. When "A4" is designated via a document size button 911 and "poster" is selected through an observation distance setting button 912, a page object size is set to "50" and a page font size is set to "30" with reference to values shown in FIG. 12 in the first embodiment.

Next, in step S1102, the object data 701 is read out from the storage section 202.

After that, in step S1103, the attribute of the object is read out from the metadata 706 of the object data 701. In a case where the read attribute is a TEXT attribute or where the read attribute is a GRAPHIC attribute and the object is a diagram or a table, the processing goes to step S1104, and when the read attribute is an attribute other than the above, the processing goes to step S1106.

In a case where the object data is the former case, that is, the case where the read attribute is a TEXT attribute or where the read attribute is a GRAPHIC attribute and the object is a diagram or a table, the average font size and the font size described above are obtained from the metadata 603 in step S1104.

Next, in step S1105, in order to perform enlargement/reduction processing, a font size after the enlargement/reduction processing is performed is calculated. The calculation of the font size is performed by the following formula.

Font Size after Enlargement/reduction Processing=Page Font Size×(Font Size/Average Font Size)

Moreover, when the object data is the latter case in step S1103, the foregoing average object size and the object size of the relevant object are obtained from the metadata 603 in step S1106.

Next, in step S1107, in order to perform enlargement/reduction processing, an object size after the enlargement/reduction processing is performed is calculated. The calculation of the object size is performed by the following formula.

Object Size after Enlargement/reduction Processing=Page Object Size×(Object Size/Average Object Size)

Next, in step S1108, the enlargement/reduction processing of the object is performed on the basis of the font size or object size after the enlargement/reduction processing thus obtained. Here, as an example, the image data 605 having a TEXT attribute is font data (or a PDL code including the font data) and therefore the font size thereof is changed, and the image data 605 having a GRAPHIC attribute is coordinate data of the outlined paths and therefore the coordinates thereof are changed. As to the image data 605 having an IMAGE attribute, the image size thereof is changed by using the bi-cubic method. In addition, the layout data 604 is updated on the basis of a display position on the preview screen 904.

Here, the object data 701 has a GRAPHIC attribute other than a diagram and therefore the object size thereof is obtained in step S1106 and an object size after the enlargement/reduction processing is calculated in step S1107. Here, the object size after the processing is "91" (=50×213/117) from the foregoing formula.

Further, in step S1108, the object data 601 including the layout data 604 and the image data 605 thus changed is temporarily stored in an image editing buffer of the storage section 202. The object data 601 thus temporarily stored is naturally reusable at the time of editing.

Finally, in step S1109, the preview of the object data 701 after the enlargement/reduction and paste processing is performed is displayed on the preview screen 904.

[Table for Document Size and Observation Distance Setting]

A description will be next given of details on the page object size and the page font size used in the foregoing paste processing with reference to FIGS. 9, 12, 13, and 14.

Figure 13:
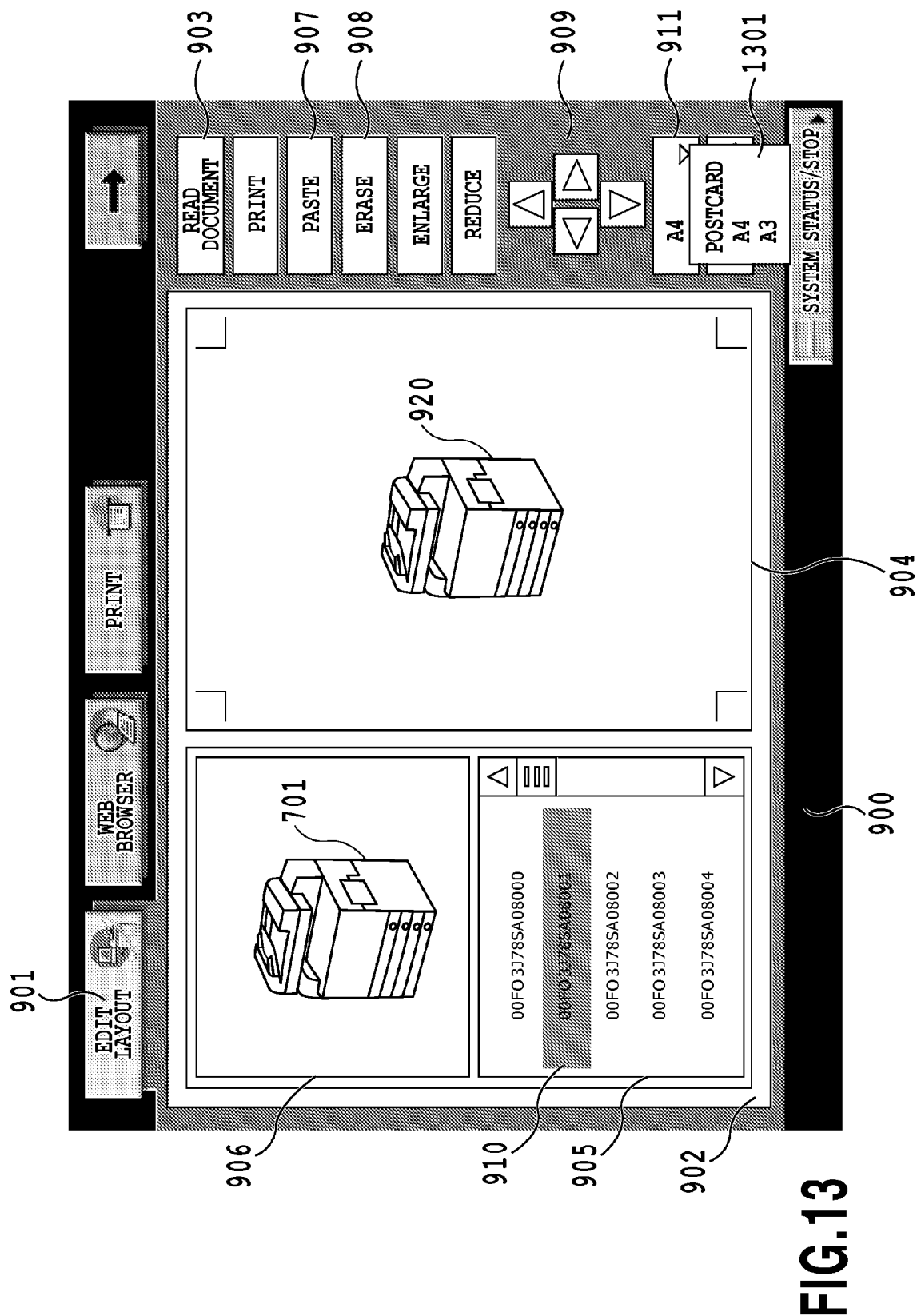
FIG. 13 is a view showing one example of the extended function operation screen according to the first embodiment.
Figure 14:
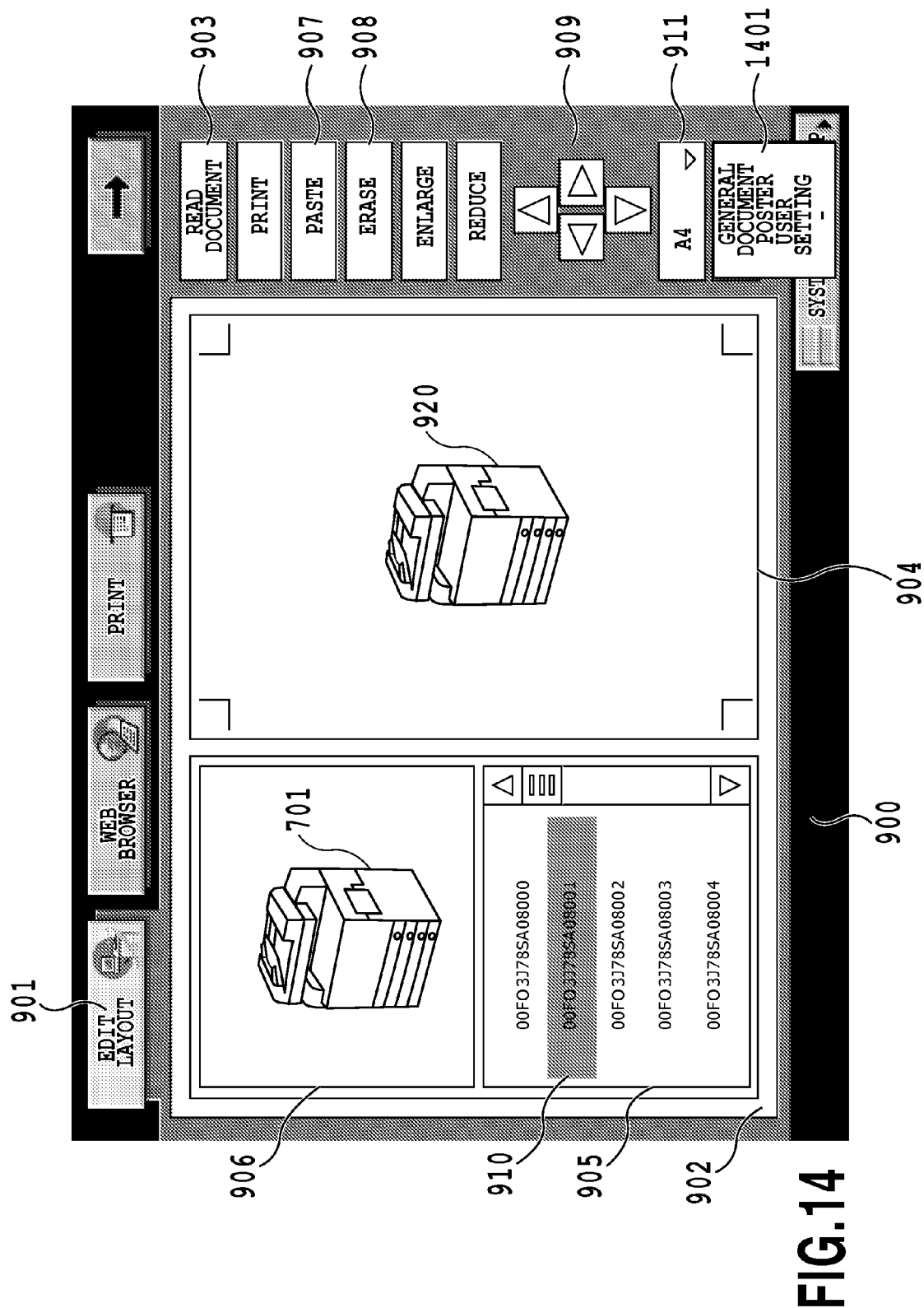
FIG. 14 is a view showing one example of the extended function operation screen according to the first embodiment.

FIG. 12 is an example of a table that relates the page object size and the page font size to a document size and observation distance setting to be described later. The table is preset by a management user. For example, let us consider a case where the size of a document to be pasted is "A4" and the document is used as a normal document. The term "normal" mentioned here refers to a case in which the user reads a document placed on a desk or a case in which the user reads a document while holding it with the user's hands. In such a case, the page object size and the page font size respectively indicate the optimal object size and font size at the time when the user reads a document of A4 size. Specifically, in the case of the normal document of A4 size, the object size and the font size are respectively set to "35" and "10" as optimal values. Each of these values is set as an average of each of the sizes. FIG. 13 is one example of a user interface (UI) screen when the document size button 911 is pressed, and FIG. 14 is one example of a UI screen when the observation distance setting button 912 is pressed.

In paste processing, a page object size and a page font size, which respectively correspond to items selected through the document size button 911 and the observation distance setting button 912, are obtained from the table shown in FIG. 12.

When the document size button 911 is pressed by the user, a document size list 1301 shown in FIG. 13 is displayed to make it possible to change the size of a document which is being edited. In addition, the second characteristic amount to be used in the paste processing can be changed with this processing. Moreover, the observation distance setting button 912 is pressed to thereby display an observation distance list 1401 shown in FIG. 14. Then, one alternative is selected from the list to thereby change setting of the observation distance during editing. The second characteristic amount to be used in the paste processing can be changed with this processing.

Also, a page default setting is prepared in the observation distance list and the setting becomes valid when editing with document reading to be described later is performed. Details on the page default setting will be described later. In this embodiment, the page object sizes and the page font sizes are prepared as a table as shown in FIG. 12 and the user selects a document size and an observation distance from the list. However, these second characteristic amounts may also be directly set.

[Edit Function with Document Reading]

Figure 15:
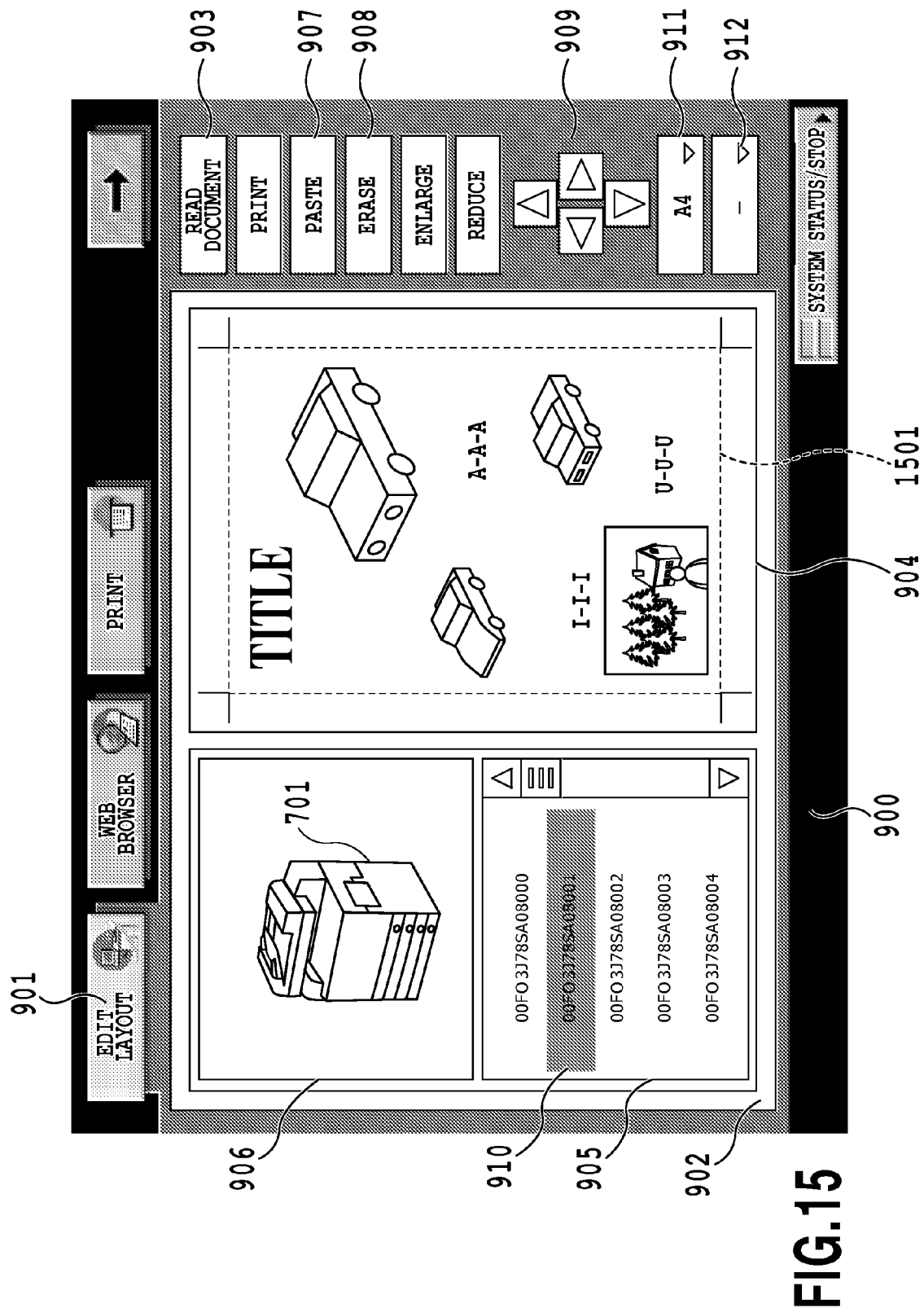
FIG. 15 is a view showing one example of the extended function operation screen according to the first embodiment.
Figure 16:
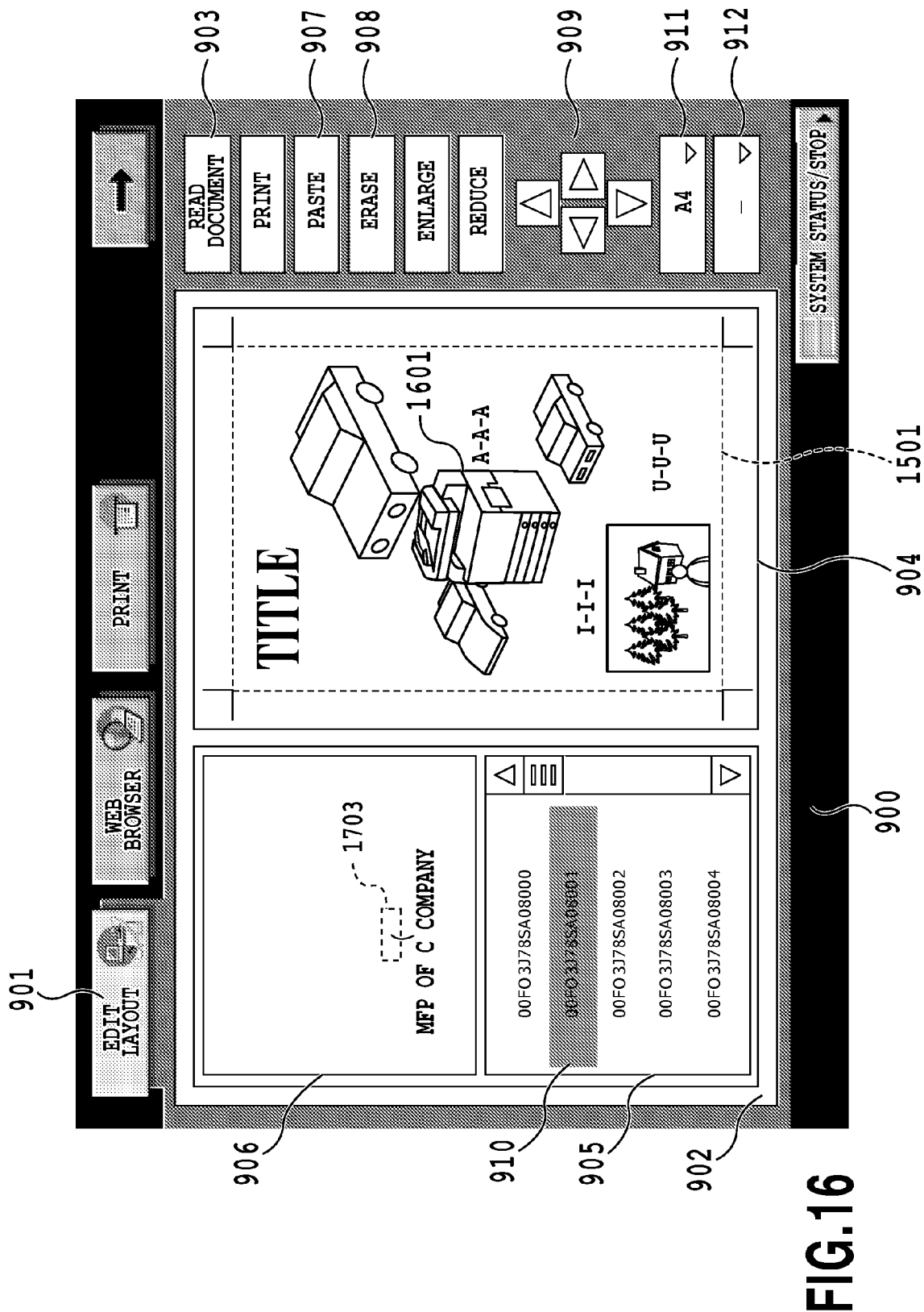
FIG. 16 is a view showing one example of the extended function operation screen according to the first embodiment.

A description will be next given of details on an edit function including document reading in the first embodiment with reference to FIGS. 9, 15, and 16.

FIG. 15 is an example of a UI screen when document reading is performed, and FIG. 16 is an example of a UI screen when the object data 701 is pasted.

In the aforementioned edit function, the user presses the document reading button 903 to read the document. Then, the user presses the observation distance setting button 912 to select page default setting shown by "-" in FIG. 14, thereby allowing the following processing to be performed.

When the document reading button 903 in FIG. 9 is pressed, read image data 1501 is displayed on the preview screen 904. Here, the observation distance setting button 912 is set to a page default shown by "-". It is assumed that the object data 701 is selected from the object list screen 905 in this state and the paste button 907 is pressed. In this case, the page object size and the page font size, which are the second characteristic amount to be used in the paste processing, are obtained from not the foregoing table but the read image data. In other words, when the page default setting is selected, an average of the object sizes of all the objects included in the read image data 1501 is used as the page object size, instead of a value determined by the size of the document in which the object is pasted and the observation distance. An average of the font sizes of all the objects included in the read image data 1501 is used as the page font size.

In FIG. 15, it is assumed that an average of the object sizes of all the objects is "38" and an average of the font sizes is "47." At this time, the paste processing is performed while the page object size is defined as "38" and the page font size is defined as "47." In FIG. 16, object data 1601 is the object data after the paste processing is performed and the object size is "69" (=38×213/117).

Second Embodiment

A description will be given of a second embodiment of the present invention below with reference to the drawings.

In this embodiment, in addition to the sizes used in the first embodiment, classification information obtained by a document structure analysis is used as the first characteristic amount described in metadata 603 of object data 601, the first characteristic amount representing a relative relationship between an object and the other objects in the document.

Here, a description will be given of the metadata on edit processing of the second embodiment with reference to FIG. 17.

Figure 17:
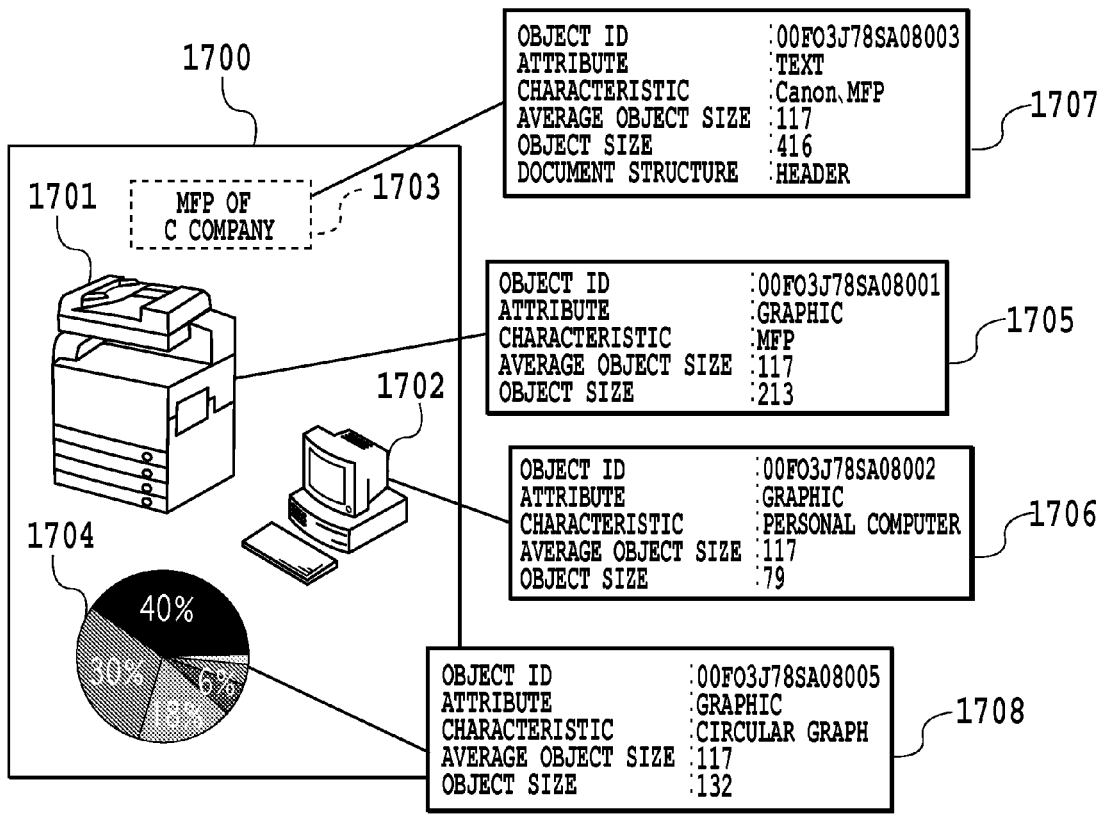
FIG. 17 is a conceptual view showing one example of object data and an original document used in a second embodiment.

FIG. 17 is a conceptual view showing an example of a document to be read out in the second embodiment and object data of objects included in this document.

A document 1700 is a document of A3 size (29.7 cm×42 cm), and when an image is read out according to the flow chart in FIG. 3, object data 1701, 1702, 1703, and 1704 are generated in steps S303 and S304. After that, the metadata 603 is generated for each of the object data in step S306. At this time, it is possible to obtain, as a part of the metadata 603, an average object size, an object size of the object, and classification information of a document structure obtained by a document structure analysis, which are the first characteristic amount representing a relative relationship between the object and the other objects in the document to be used in paste processing to be described later. Then, these information items are included in the metadata 603 and stored in a storage section 202 in step S307.

In this embodiment, classification information of the document structure comprises, for example, a header (title, date, company name, and the like), a footer (page number and the like), and a main body other than these. The classification information of the document structure is valid only for object data having a TEXT attribute including font data. Processing for object data having attributes other than the TEXT attribute is the same as that of the first embodiment and thus the description thereof will be omitted. It should be noted that the classification information of the document structure is not limited to the above information and any information may be employed as long as information relates to the document structure.

Figure 18:
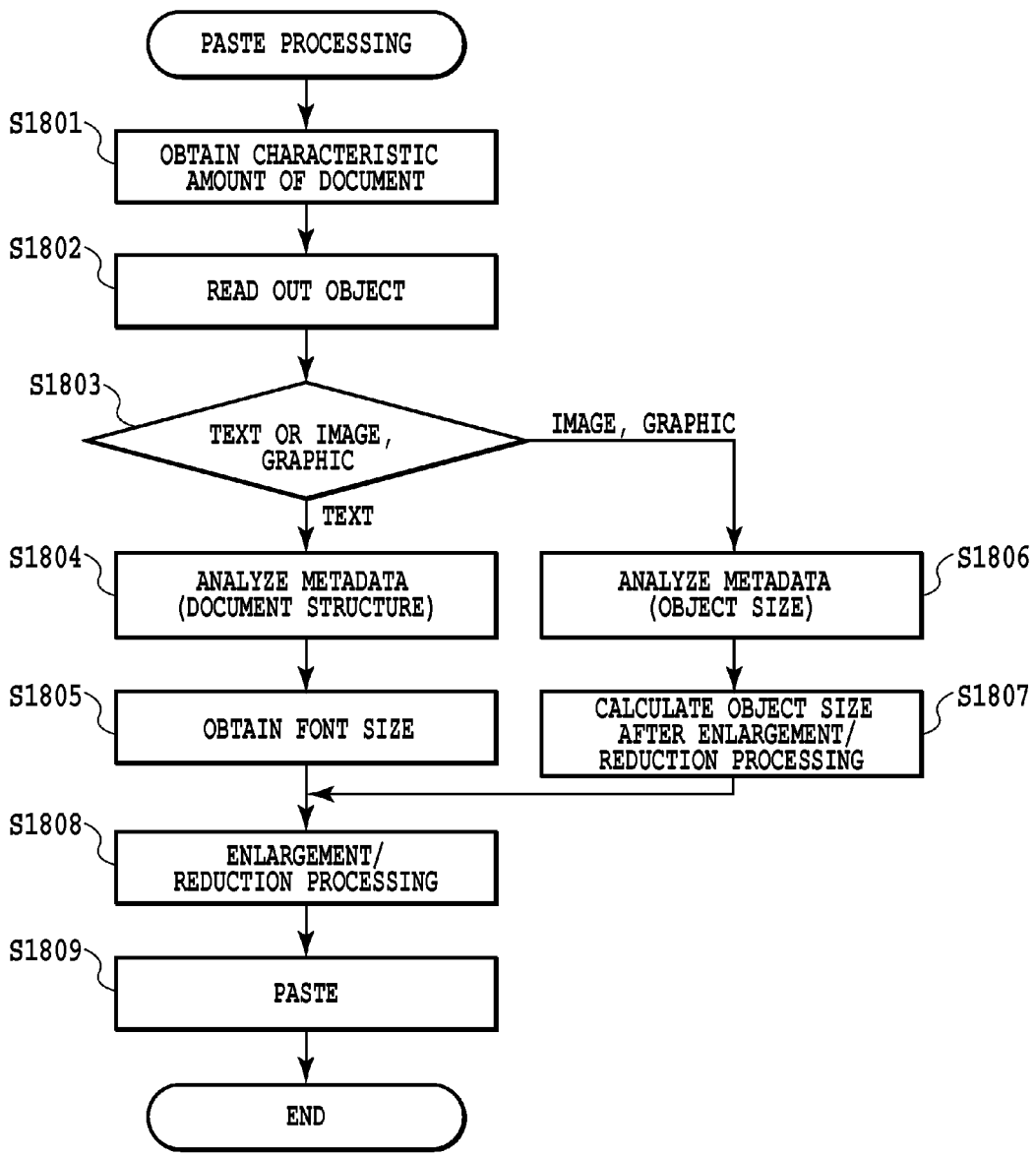
FIG. 18 is a flowchart of paste processing according to the second embodiment.
Figure 19:
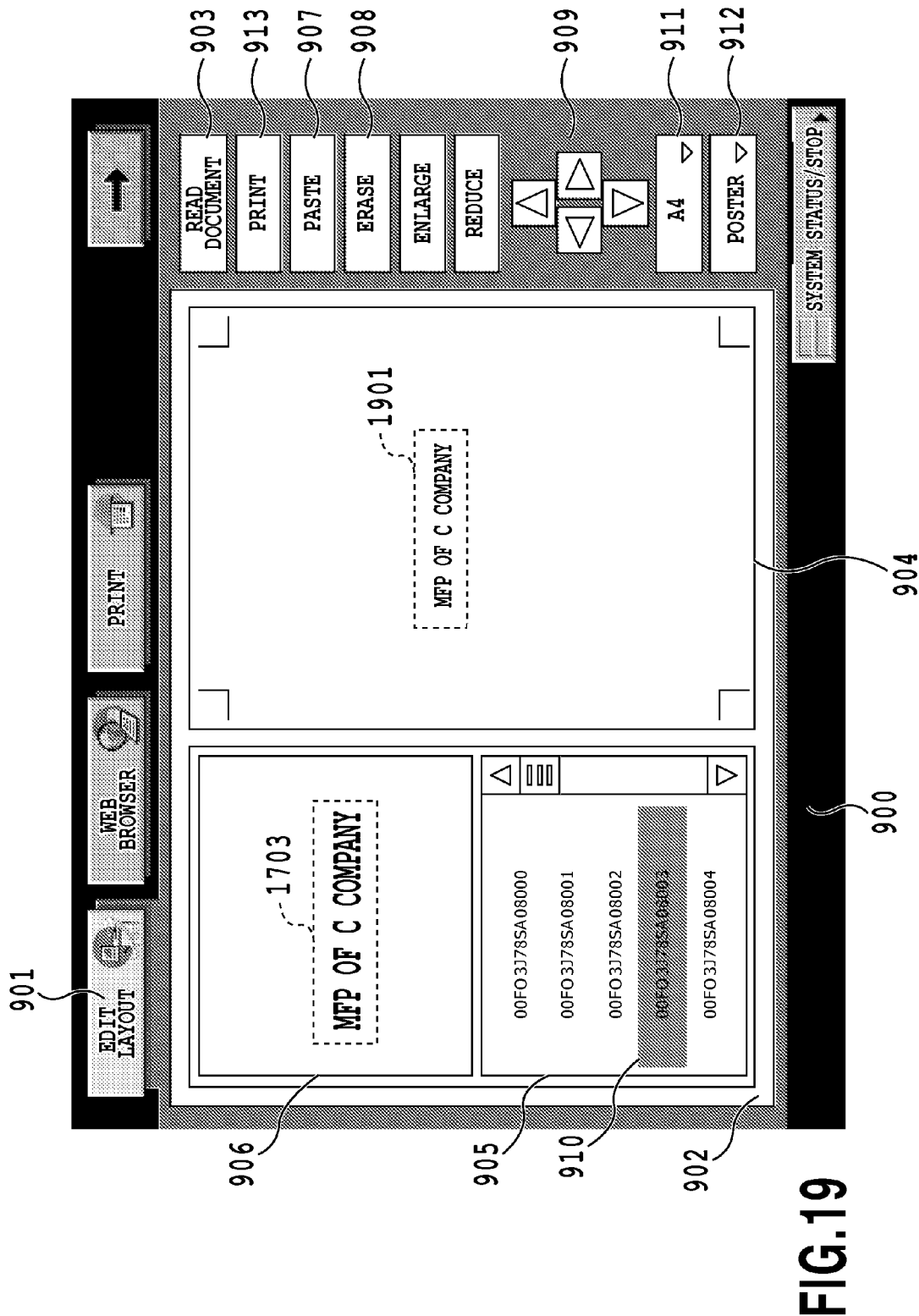
FIG. 19 is a view showing one example of an extended function operation screen according to the second embodiment.

A description will be next given of details on paste processing according to the second embodiment with reference to FIG. 9 and FIGS. 18 and 19.

FIG. 18 is a flowchart of the paste processing according to the second embodiment. All operations are controlled by the control section (not shown) of the image processing apparatus. FIG. 19 is a view showing one example of a UI screen according to the second embodiment.

When a certain object ID is selected from an object list screen 905 on an edit layout screen 902, shading 910 is applied on the display of the selected ID. Then, a preview of the object data is displayed on the object preview screen 906. Here, object data 1703 is selected as an example.

When the user presses a paste button 907 in this state, a second characteristic amount (page object size and page font size) according to the document size and the observation distance setting, which has been explained in the first embodiment, is obtained from a table shown in FIG. 20 in step S1801.

Next, in step S1802, the object data 1703 is read out from the storage section 202.

After that, in step S1803, an object attribute is read out from the metadata 603 of the object data 1703. When the attribute of the object data 1703 is a TEXT attribute, the processing goes to step S1804.

In step S1804, classification information of a document structure is obtained from the metadata 603.

Next, in step S1805, a font size ("42"), which corresponds to a document size ("A4"), observation distance setting ("poster") and classification information ("header") of a document structure, is obtained from a table shown in FIG. 20 to be described later. FIG. 20 is preset by a management user, similar to FIG. 12. For example, let us consider a case where a size of a document in which the object is pasted is "A4" and the document is used as a normal document. In such a case, the font size indicates a value suitable when the user reads a document of A4 size. Moreover, the font size is appropriately determined according to classification information showing how the font is used in the document structure. Specifically, in the case of the normal document of A4 size, the font size used as a header is set to "20" as an optimal value, the font size used as a main body is set to "12" as an optimal value, and the font size used as a footer is set to "10" as an optimal value.

Next, in step S1808, enlargement/reduction processing for the object is performed on the basis of the font size obtained in step S1805. The object data 1703 has image data 605 having a TEXT attribute and this is font data (or a PDL code including font data) and therefore the font size is changed to "42." In addition, layout data 604 is updated on the basis of a display position on the preview screen 904.

Further, in step S1808, the layout data 604 thus changed and the object data 601 including image data 605 are temporarily stored in an image editing buffer of the storage section 202. The object data 601 thus temporarily stored is naturally reusable at the time of editing.

Subsequently, in step S1809, on the preview screen 904, a preview of object data 1901 after the enlargement/reduction and paste processing is performed is displayed (FIG. 19).

It should be noted that object data having an attribute other than the TEXT attribute (IMAGE attribute or GRAPHIC attribute) is the same as that in the first embodiment and thus the detailed description thereof will be omitted. Incidentally, in the case of object data having an attribute other than the TEXT attribute, processing in steps S1801 to S1802, S1806 to S1807 and S1808 to S1809 shown in FIG. 18 are the same as that in steps S1101 to S1102, S1106 to S1107 and S1108 to S1109 shown in FIG. 11, respectively.

A description will be next given of details on the above-described table describing the second characteristic amount according to the document size, the observation distance setting and classification information of the document structure in the second embodiment with reference to FIG. 20.

FIG. 20 is a view showing one example of a table which relates the font size used in the enlargement/reduction processing to the document size, the observation distance setting and classification information of the document structure.

In paste processing, the font size of object data having a TEXT attribute, which corresponds to an item designated by a document size button 911 and an observation distance setting button 912, is obtained from the table shown in FIG. 20. Moreover, when the document size button 911 is pressed by the user, a document size list 1301 shown in FIG. 13 is displayed to make it possible to change the size of a document which is being edited. In addition, the second characteristic amount to be used in the paste processing can be changed with this processing. Moreover, the observation distance setting button 912 is pressed to thereby display an observation distance list 1401 shown in FIG. 14. Then, one alternative is selected from the list to thereby change setting of the observation distance during editing. The second characteristic amount to be used in the paste processing can be changed with this processing. In this embodiment, the configuration is made such that the font size may be prepared as a table and the user may select a font size from the list. Alternatively, the second characteristic amount may be directly inputted and set.

The other configuration and processing contents are the same as those of the first embodiment and thus the description thereof will be omitted.

Other Embodiments

Moreover, the present invention can be applied to a system formed of multiple devices (for example, a computer, an interface device, a reader, a printer, and the like), or an apparatus consisting of a single device (a multi function device, a printer, a facsimile apparatus, and the like).

Further, the object of the present invention can be achieved by causing a computer (or a central processing unit (CPU) or a micro processing unit (MPU)) of the system or the apparatus to read out and execute program codes from a storage medium that stores the program codes for implementing the procedure in the flowchart shown in the foregoing embodiments. In this case, the program codes read out from the storage medium implement the functions of the aforementioned embodiments by themselves. Accordingly, the program codes and the computer-readable storage medium that stores or records the program codes also constitute aspects of the present invention.

As a storage medium for supplying the program codes, it is possible to use, for example, a floppy disk, a hard disk, an optical disk, an optical magnetic disk, a CD-ROM, a CD-R, a magnetic tape, a non-volatile memory card, a ROM, and the like.

Moreover, the functions of the aforementioned embodiments are implemented when the readout program is executed by the computer. Further, execution of the program includes a case in which an OS and the like running on the computer performs part of or all of actual processing on the basis of the instructions by the program.

Furthermore, the functions of the aforementioned embodiments can be also implemented by a function expansion board inserted into the computer or a function expansion unit connected to the computer. In this case, first, the program read out from the storage medium is written in the memory of the function expansion board inserted into the computer or the function expansion unit connected to the computer. After that, the CPU and the like provided in the function expansion board or the function expansion unit performs part of or all of actual processing on the basis of the instructions by the program. Thus, the functions of the aforementioned embodiments are also implemented by processing performed by the function expansion board or the function expansion unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-244103, filed Sep. 20, 2007, which is hereby incorporated by reference herein in its entirety.

What is claimed is:

1. An information processing apparatus that separates objects from image data of a read document to allow the objects to be reused, the information processing apparatus comprising:
    a storing unit configured to store in metadata a first object size and an average size of all the objects included in the image data when the first object to be reused is separated from the image data of the read document and stored;
    a first obtaining unit configured to obtain a ratio of the first object size to the average size of all the objects included in the image data for obtaining the size of the first object stored in the storing unit relative to the read document;
    a designating unit configured to receive a designation of a size of a document to which the first object is outputted and a designation of the observation distance which is the distance for observing the document to which the first object is outputted;
    a second obtaining unit configured to obtain a value defined in accordance with a combination of the size of the document for which the designating unit receives a designation of the size thereof and the observation distance of the document for which the designating unit receives a designation of the size thereof;
    an enlargement/reduction processing unit configured to perform enlargement/reduction processing on the stored first object by using a value for enlarging the first object as the object distance increases, the value for enlarging the first object as the object distance increases being based on the ratio of the first object size obtained in the first obtaining unit and the value obtained in the second obtaining unit; and
    a pasting unit configured to paste the first object subjected to the enlargement/reduction processing into image data of the document to which the first object is outputted.

2. The information processing apparatus according to claim 1, wherein the metadata includes a font size of the first object in the event the first object comprises a font, and an average font size of all the objects in the image data that comprise fonts;
    if the first object has a text attribute or if the first object has a graphic attribute and is a diagram, the first obtaining unit obtains a ratio of the first object font size to the average font size of all the objects included in the image data; and
    the enlargement/reduction processing unit performs enlargement/reduction processing of the first object by using a value for enlarging the first object as the object distance increases, the value for enlarging the first object as the object distance increases being based on the ratio of the first object font size obtained in the first obtaining unit and the value obtained in the second obtaining unit.

3. The information processing apparatus according to claim 1, wherein the metadata includes classification information of a document structure in the read document; and
    if the first object has a text attribute, a value defined in accordance with a combination of the size of the document to which the first object is outputted and the observation distance of the document to which the first object is outputted is defined in accordance with a combination of the size of the document to which the first object is outputted, the observation distance which is the distance for observing the document to which the first object is outputted, and classification information of the document structure.

4. An information processing method for separating objects from image data of a read document to allow the objects to be reused, the information processing method comprising:
    a storing step for storing in metadata a first object size and an average size of all the objects included in the image data when the first object is separated from the image data of the read document and stored;
    a first obtaining step for obtaining a ratio of the first object size to the average size of the objects included in the image data for obtaining the size of the first object relative to the read document;
    a designating step for receiving a designation of a size of a document to which the first object is outputted and a designation of the observation distance, which is the distance for observing the document to which the first object is outputted;
    a second obtaining step for obtaining a value defined in accordance with a combination of the size of the document for which the designating step receives a designation of the size thereof and the observation distance of the document for which the designating step receives a designation of the size thereof;

an enlargement/reduction processing step for performing enlargement/reduction processing on the stored first object by using a value for enlarging the first object as the object distance increases, the value for enlarging the first object as the object distance increases being based on the ratio of the first object size obtained in the first obtaining step and the value obtained in the second obtaining step; and a pasting step for pasting the first object subjected to the enlargement/reduction processing into image data of the document to which the first object is outputted.

5. The information processing method according to claim 4, wherein the metadata includes a font size of the first object and an average font size of all the objects in the image data;

if the first object has a text attribute or if the first object has a graphic attribute and is a diagram, the first obtaining step obtains a ratio of the first object font size to the average font size of all the objects included in the image data; and the enlargement/reduction processing step performs enlargement/reduction processing of the stored first object by using a value for enlarging the first object as the object distance increases, the value for enlarging the first object as the object distance increases being based on the ratio of the first object font size obtained in the first obtaining step and the value obtained in the second obtaining step.

6. The information processing method according to claim 4, wherein the metadata includes classification information of a document structure in the read document; and if the first object to be processed has a text attribute, a value defined in accordance with a combination of the size of the document to which the first object is outputted and the observation distance of the document to which the first object is outputted is defined in accordance with a combination of the size of the document to which the first object is outputted, the observation distance which is the distance for observing the document to which the first object is outputted, and classification information of a document structure in the read document.

7. A non-transitory computer-readable storage medium that stores a program, the program causing a computer to execute the information processing method for separating objects from image data of a read document to allow the objects to be reused, the information processing method comprising:

a storing step for storing in metadata a first object size and an average size of all the objects included in the image data when the first object is separated from the image data of the read document and stored;

a first obtaining step for obtaining a ratio of the first object size to the average size of the objects included in the image data for obtaining the size of the first object relative to the read document;

a designating step for receiving a designation of a size of a document to which the first object is outputted and a designation of the observation distance, which is the distance for observing the document to which the first object is outputted;

a second obtaining step for obtaining a value defined in accordance with a combination of the size of the document for which the designating step receives a designation of the size thereof and the observation distance of the document for which the designating step receives a designation of the size thereof;

an enlargement/reduction processing step for performing enlargement/reduction processing on the stored first object by using a value for enlarging the first object as the object distance increases, the value for enlarging the first object as the object distance increases being based on the ratio of the first object size obtained in the first obtaining step and the value obtained in the second obtaining step; and a pasting step for pasting the first object subjected to the enlargement/reduction processing into image data of the document to which the first object is outputted.

* * * * *